(12) United States Patent
Sommer et al.

(10) Patent No.: US 7,483,892 B1
(45) Date of Patent: *Jan. 27, 2009

(54) METHOD AND SYSTEM FOR OPTIMALLY SEARCHING A DOCUMENT DATABASE USING A REPRESENTATIVE SEMANTIC SPACE

(75) Inventors: Matthew S. Sommer, Addison, TX (US); Kevin B. Thompson, Evanston, IL (US)

(73) Assignee: Kroll Ontrack, Inc., Eden Prairie, MN (US)

( * ) Notice: Subject to any disclaimer, the term of this patent is extended or adjusted under 35 U.S.C. 154(b) by 465 days.

This patent is subject to a terminal disclaimer.

(21) Appl. No.: 11/041,799

(22) Filed: Jan. 24, 2005

Related U.S. Application Data

(63) Continuation of application No. 10/131,888, filed on Apr. 24, 2002, now Pat. No. 6,847,966.

(51) Int. Cl.
*G06F 17/30* (2006.01)
(52) U.S. Cl. .................. 707/5; 707/3; 707/6; 707/100; 704/1
(58) Field of Classification Search ............... 707/1–6, 707/100; 715/500, 513; 704/1, 202
See application file for complete search history.

(56) References Cited

U.S. PATENT DOCUMENTS

| | | | |
|---|---|---|---|
| 4,839,853 A | 6/1989 | Deerwester et al. | 364/900 |
| 5,301,109 A * | 4/1994 | Landauer et al. | 704/9 |
| 5,642,518 A | 6/1997 | Kiyama et al. | 395/757 |
| 5,675,819 A | 10/1997 | Schuetze | 395/760 |
| 5,873,056 A | 2/1999 | Liddy et al. | 704/9 |
| 5,895,464 A | 4/1999 | Bhandari et al. | 707/3 |
| 5,950,189 A | 9/1999 | Cohen et al. | 707/3 |
| 5,953,718 A | 9/1999 | Wical | 707/5 |
| 5,983,237 A | 11/1999 | Jain et al. | 707/104 |
| 6,101,492 A | 8/2000 | Jacquemin et al. | 707/3 |
| 6,138,116 A | 10/2000 | Kitagawa et al. | 707/5 |

(Continued)

OTHER PUBLICATIONS

Steinbach, Michael, et al., "A Comparison of Document Clustering Techniques," Department of Computer Science and Engineering, University of Minnesota, 20 pgs.

(Continued)

*Primary Examiner*—Cheryl Lewis
(74) *Attorney, Agent, or Firm*—Conley Rose, P.C.

(57) ABSTRACT

A term-by-document matrix is compiled from a corpus of documents representative of a particular subject matter that represents the frequency of occurrence of each term per document. A weighted term dictionary is created using a global weighting algorithm and then applied to the term-by-document matrix forming a weighted term-by-document matrix. A term vector matrix and a singular value concept matrix are computed by singular value decomposition of the weighted term-document index. The k largest singular concept values are kept and all others are set to zero thereby reducing to the concept dimensions in the term vector matrix and a singular value concept matrix. The reduced term vector matrix, reduced singular value concept matrix and weighted term-document dictionary can be used to project pseudo-document vectors representing documents not appearing in the original document corpus in a representative semantic space. The similarities of those documents can be ascertained from the position of their respective pseudo-document vectors in the representative semantic space.

31 Claims, 11 Drawing Sheets

Singular Value Decomposition (SVD)

$A = T_0 \quad S_0 \quad D_0^T$

Singular value decomposition of a term-by-document matrix, matrix $\hat{A}$,
where:
matrix $T_0$ has orthogonal, unit-length columns ($T_0^T T_0 = I$), where matrix $I$ is the identity matrix;
matrix $D_0$ has orthogonal, unit-length columns ($D_0^T D_0 = I$), where matrix $I$ is the identity matrix;
matrix $S_0$ is a diagonal matrix of singular values;
$t$ is the number of rows of the term-by-document matrix $\hat{A}$;
$d$ is the number of columns of the term-by-document matrix $\hat{A}$; and
$m$ is the rank of the term-by-document matrix $\hat{A}$; $m \leq \min(t, d)$.

U.S. PATENT DOCUMENTS 6,356,864 B1 * 3/2002 Foltz et al. .................... 704/1
6,615,208 B1 * 9/2003 Behrens et al. ................ 707/5
6,847,966 B1 * 1/2005 Sommer et al. ............... 707/5

OTHER PUBLICATIONS

Zamir, Oren, et al., "Grouper: A Dynamic Clustering Interface to Web Search Results," Department of Computer Science and Engineering, University of Washington, 15 pgs.

Zamir, Oren, et al., "Web Document Clustering: A Feasibility Demonstration," Department of Computer Science and Engineering, University of Washington, 9 pgs.

Deerwester, et al., *Indexing by Latent Semantic Analysis*, date unknown.

Kolda, et al., *A Semidiscrete Matrix Decomposition for Latent Semantic Indexing in Information Retrieval*, date unknown.

Berry, *Latent Semantic Indexing*, date unknown.

Foltz, *Using Latent Semantic Indexing for Information Filtering*, date unknown.

Author unknown, *Latent Semantic Indexing (LSI)*, date unknown.

Author unknown, *Indexing and Custering*, http://www.media.mit.edu/~emnett/research/sliders/s1d011.htm, date unknown.

Author unknown, *Slide Presentation*, (Slides 1-12), http://www.cs.rip.edu/~sidbel/4962/class 10, date unknown.

Author unknown, *Latent Semantic Indexing*, date unknown.

* cited by examiner

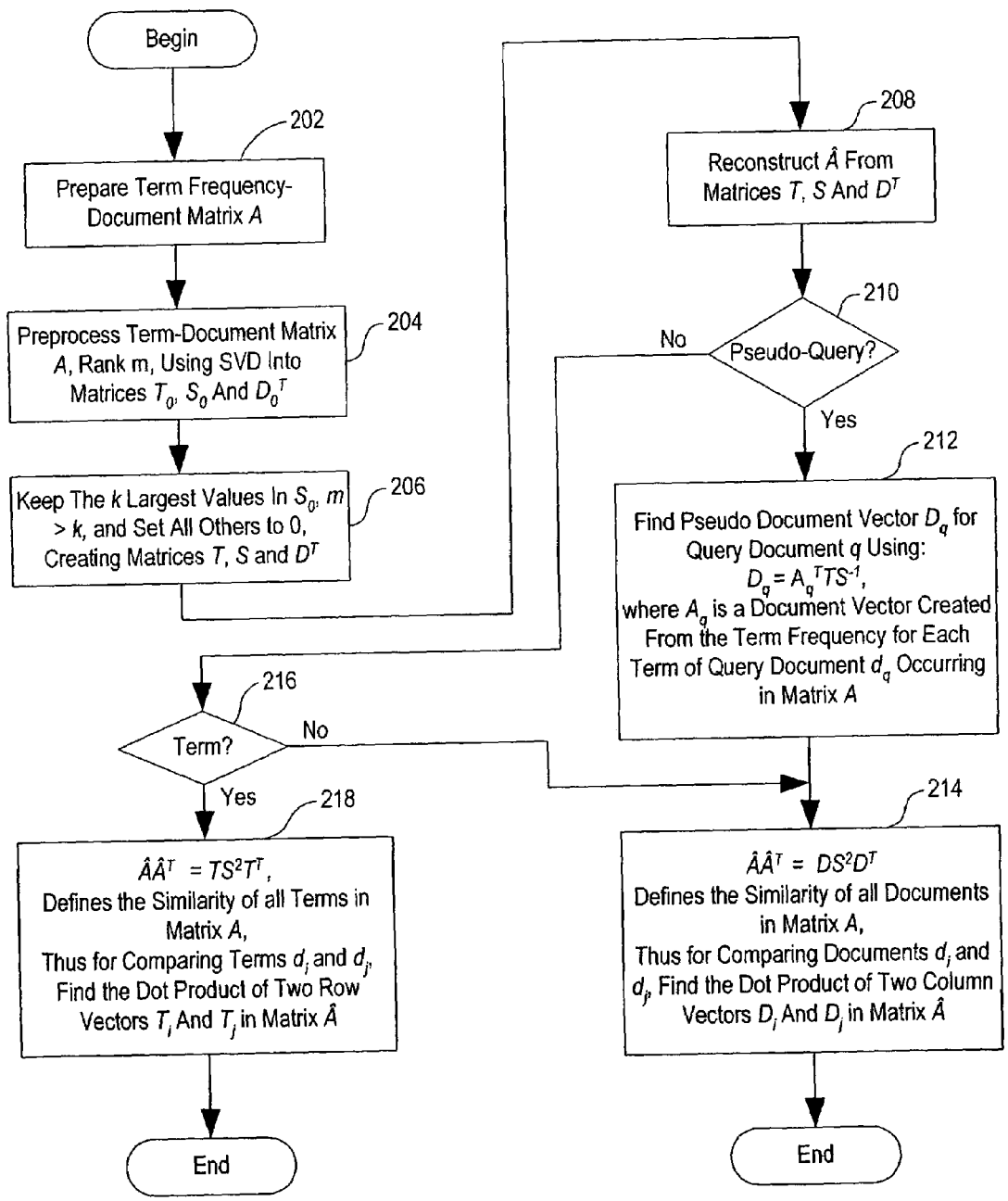

FIG. 3
Singular Value Decomposition (SVD)

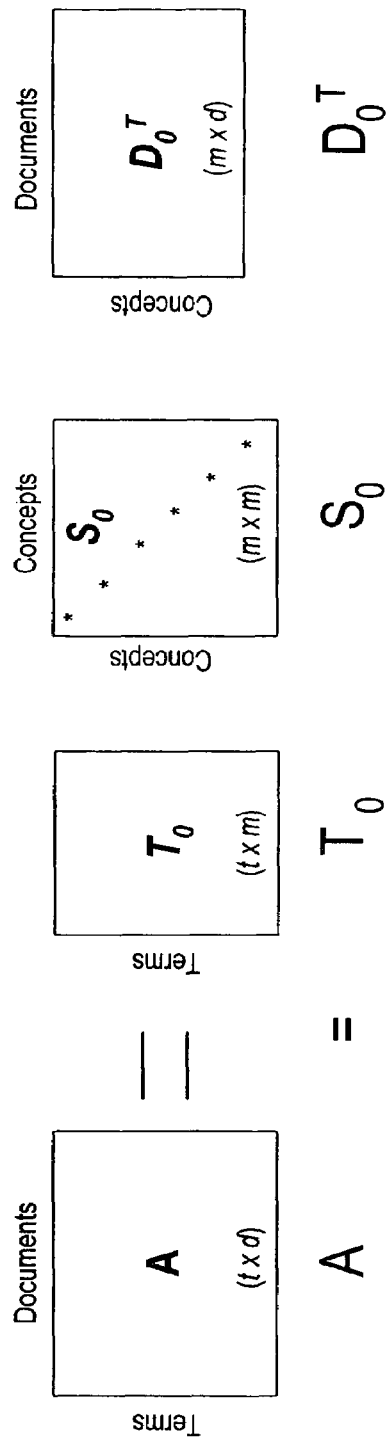

$$\hat{A} = T_0 S_0 D_0^T$$

Singular value decomposition of a term-by-document matrix, matrix $\hat{A}$,
where:
matrix $T_0$ has orthogonal, unit-length columns ($T_0^T T_0 = I$), where matrix $I$ is the identity matrix;
matrix $D_0$ has orthogonal, unit-length columns ($D_0^T D_0 = I$), where matrix $I$ is the identity matrix;
matrix $S_0$ is a diagonal matrix of singular values;
$t$ is the number of rows of the term-by-document matrix $\hat{A}$;
$d$ is the number of columns of the term-by-document matrix $\hat{A}$; and
$m$ is the rank of the term-by-document matrix $\hat{A}$; $m \leq \min(t, d)$.

FIG. 4
Singular Value Decomposition (SVD)

$$\hat{A} = T \; S \; D^T$$

where Â is (t × d), T is (t × k), S is (k × k), and $D^T$ is (k × d).

- Â: Documents × Terms
- T: Concepts × Terms
- S: Concepts × Concepts
- $D^T$: Documents × Concepts Singular value decomposition of a term-by-document matrix, matrix Â, where:
matrix T has orthogonal, unit-length columns ($T^T T = I$), where matrix $I$ is the identity matrix;
matrix D has orthogonal, unit-length columns ($D^T D = I$), where matrix $I$ is the identity matrix;
matrix S is a diagonal matrix of singular values;
$t$ is the number of rows of the term-by-document matrix Â;
$d$ is the number of columns of the term-by-document matrix Â;
$m$ is the rank of the term-by-document matrix Â; $m \leq \min(t, d)$; and
$k$ is chosen such that $k \leq m$ Representative Semantic Analysis Creating a Concept Database Creating a Document Database Creating A Query Pseudo-Document Vector Searching A Document Database

METHOD AND SYSTEM FOR OPTIMALLY SEARCHING A DOCUMENT DATABASE USING A REPRESENTATIVE SEMANTIC SPACE

CROSS-REFERENCE OT RELATED APPLICATION

This application is a continuation of U.S. application Ser. No. 10/131,888 filed Apr. 24, 2002, now U.S. Pat. No. 6,847, 966, issued Jan. 25, 2005, entitled Method and System for Optimally Searching a Document Database Using a Representative Semantic Space.

TECHNICAL FIELD OF THE INVENTION

The present invention relates generally to data processing and more generally to document searching. The present invention more particularly relates to using a representational semantic space for comparing the similarity of document representations.

BACKGROUND OF THE INVENTION

Information is being created and made available to the public at a greater rate than ever before, due for the most part, to advances in information technology and electronic communications systems. There is so much information that it is simply not possible for an individual person to read it all, much less remember its content, context or the semantic concepts that are associated with it. Still, many times an enterprise relies on certain information items reaching certain enterprise members. Even before the recent advances in information technology and electronic communications systems, it was understood that there was a need for efficient and accurate information retrieval. The result was myriad information retrieval processes and strategies that worked relatively well under a narrowly-defined set of searching conditions.

Probably the simplest of all information retrieval techniques is word or term searching. Term searching involves a user querying a corpus of documents containing information for a specific term or word. A resultant solution set of documents is then identified as containing the search term. Single term searching is extremely fast and efficient because little computational effort is involved in the query process, but it can result in a relatively large solution set of unranked documents being returned. Many of the documents may not be relevant to the user because, although the term occurs in the solution document, it is out of context with the user's intended meaning. This often precipitates the user to perform a secondary search for a more relevant solution set of documents. Even if all of the resultant documents use the search term in the proper context, the user has no way of judging which documents in the solution set are more relevant than others. Additionally, a user must have some knowledge of the subject matter of the search topic for the search to be efficient (e.g., a less relevant word in a query could produce a solution set of less relevant documents and cause more relevant documents in the solution set to be ranked lower than more relevant documents).

Another pitfall of term searching is that traditional term searching overlooks many potential relevant documents because of case and inflectional prefixes and suffixes added to a root word as that word is used in a document, even though those words are used in context with the user's intent (e.g., "walking," "walks," "walker" have in common the root "walk" and the affixes -ing, -s, and -er). Searching for additional affixes of a root or base word is called "word stemming." Often word stemming is incorporated in a search tool as an automated function but some others require the user to identify the manner in which a query term should be stemmed, usually by manually inserting term "truncaters" or "wildcards" into the search query. Word stemming merely increases the possibility that a document be listed as relevant, thereby further increasing the size of the solution set without addressing the other shortcomings of term searching.

A logical improvement to single term searching is multiple, simultaneous term searching using "Boolean term operators," or simply, Boolean operators. A Boolean retrieval query passes through a corpus of documents by linking search terms together with Boolean operators such as AND, OR and NOT. The solution set of documents is smaller than single term searches and all returned documents are normally ranked equally with respect to relevance. The Boolean method of term searching might be the most widely used information retrieval process and is often used in search engines available on the Internet because it is fast, uncomplicated and easy to implement in a remote online environment. However, the Boolean search method carries with it many of the shortcomings of term searching. The user has to have some knowledge of the search topic for the search to be efficient in order to avoid relevant documents being ranked as non-relevant and visa versa. Furthermore, since the returned documents are not ranked, the user may be tempted to reduce the size of the solution set by including more Boolean linked search terms. However, increasing the number of search terms in the query narrows the scope of the search and thereby increases the risk that a relevant document is missed. Still again, all documents in the solution set are ranked equally.

Other information retrieval processes were devised that extended and refined the Boolean term searching method to, although not necessarily reducing the size of the solution set, attempt to rank the resultant documents. One such effort is by term weighting the query terms and/or term weighting the occurrence of terms in the solution set of documents by frequency. Expanded term weighting operations make ranking of documents possible by assigning weights to search terms used in the query. Documents that are returned with higher ranking search terms are themselves ranked higher in relevance. However, a more useful variation of term weighting is by occurrence frequency in resultant document database, thereby allowing the documents in the solution set to be ranked. A higher term occurrence frequency in a resultant document is indicative of relevance. Boolean searching variants that allow for term frequency based document ranking have a number of drawbacks, the most obvious of which is that longer documents have a higher probability of being ranked higher in the solution set without a corresponding increase in relevance. Additionally, because the occurrence of the term is not context related, higher ranking documents are not necessarily more relevant to the user. Moreover, if the user does not have an understanding of the subject matter being searched, the combination of Boolean logic and term weighting may exclude the most relevant documents from the solution and simultaneously under rank the most relevant documents to the subject matter. Additionally, certain techniques are language dependent, for instance word stemming and thesaurus.

Information retrieval methods have been devised that combine Boolean logic with other techniques such as content-based navigation, where shared terms from previously attained documents are used to refine and expand the query. Additionally, Boolean operators have been replaced with fuzzy operators that recognize more than simple true and false values and weighted query expansion has been accomplished using a thesaurus. Thesaurus or a dictionary is a common way to expand queries and can be used to broaden the meaning of the term as well as narrowing it down or simply finding related terms. The main problem of using a thesaurus is that terms have different meanings, depending upon the subject. Thesaurus is therefore often used in databases within a special field like pharmacological and biomedical databases where they can be constructed manually. While each of the above described improvements provide some benefit to the user, the solution set of documents does not optimally convey the right information to a user if the user does not have an understanding of the subject matter being searched.

SUMMARY OF THE INVENTION

A term-by-document matrix is compiled from a corpus of documents representative of a particular subject matter that represents the frequency of occurrence of each term per document. A weighted term dictionary is created using a global weighting algorithm and then applied to the term-by-document matrix forming a weighted term-by-document matrix. A term vector matrix and a singular value concept matrix are computed by singular value decomposition of the weighted term-document index. The k largest singular concept values are kept while all others are set to zero thereby reducing the concept dimensions in the term vector matrix and a singular value concept matrix. The reduced term vector matrix, reduced singular value concept matrix and weighted term-document dictionary can be used to project pseudo-document vectors representing documents not appearing in the original information corpus, in a representative semantic space. The similarities of those documents can be ascertained from the position of their respective pseudo-document vectors in the representative semantic space.

In accordance with one exemplary embodiment, a collection of documents is identified as having a similar subject matter as the original information corpus. Pseudo-document vectors for documents in the collection are computed by the product of the reduced term vector matrix, the inverse of the singular value concept matrix and a transposed column term vector consisting of the global term weight of each term co-occurring in the weighted term dictionary and the document. The similarity of two documents can be found by the dot product of the documents' pseudo-document vectors.

In accordance with another exemplary embodiment, a pseudo-query document vector is computed for each document in the collection by finding the product of the reduced term vector matrix, the inverse of the singular value concept matrix and a transposed column term vector consisting of the global term weight of each term co-occurring in the weighted term dictionary and the terms in each document. The similarity of the query to any document in the collection can be found by the dot product of the documents' pseudo-document vectors.

In accordance with still another exemplary embodiment, a similarity index for all documents in the collection can be created by compiling all pseudo-document vectors representing documents in the collection into a reduced term-by-pseudo-document matrix and then finding the product of the reduced term-by-pseudo-document matrix and its transpose.

In accordance with still another exemplary embodiment, documents not relevant for a comparison with a query document are eliminated from a comparison by first creating an inverted index, which maps each term in the collection of documents to the documents in the collection in which that term appears. A term search is accomplished using the Boolean query to search the inverted index to obtain a filtered subset S of matching documents. The similarity index for the subset S of matching documents can be created by compiling all pseudo-document vectors representing documents in the filtered subset S and the pseudo-query document vector into a reduced term-by-pseudo-document matrix and then finding the product of the reduced term-by-pseudo-document matrix and its inverse.

In accordance with still another exemplary embodiment, documents not relevant for a comparison can be first eliminated from the comparison by creating a field index, which maps the value of a document field to the corresponding documents in the collection containing the field with that value. A field search is accomplished using the field query to search the field index to obtain a filtered subset S of matching documents. The similarity index for the subset S of matching documents can be created by compiling all pseudo-document vectors representing documents in the filtered subset S into a reduced term-by-pseudo-document matrix and then finding the product of the reduced term-by-pseudo-document matrix and its Inverse.

BRIEF DESCRIPTION OF THE DRAWINGS

The novel features believed characteristic of the invention are set forth in the appended claims. The invention itself, however, as well as an exemplary mode of use, further objectives and advantages thereof, will best be understood by reference to the following detailed description of an illustrative embodiment when read in conjunction with the accompanying drawings, wherein:

FIG. 2 is a flowchart depicting a prior art process for determining the similarity of documents and terms in a semantics base using latent semantic indexing;

FIG. 3 is a diagram representing a typical singular value decomposition of matrix A;

FIG. 4 is a diagram representing a reduced singular value decomposition of matrix A;

Figure 1:
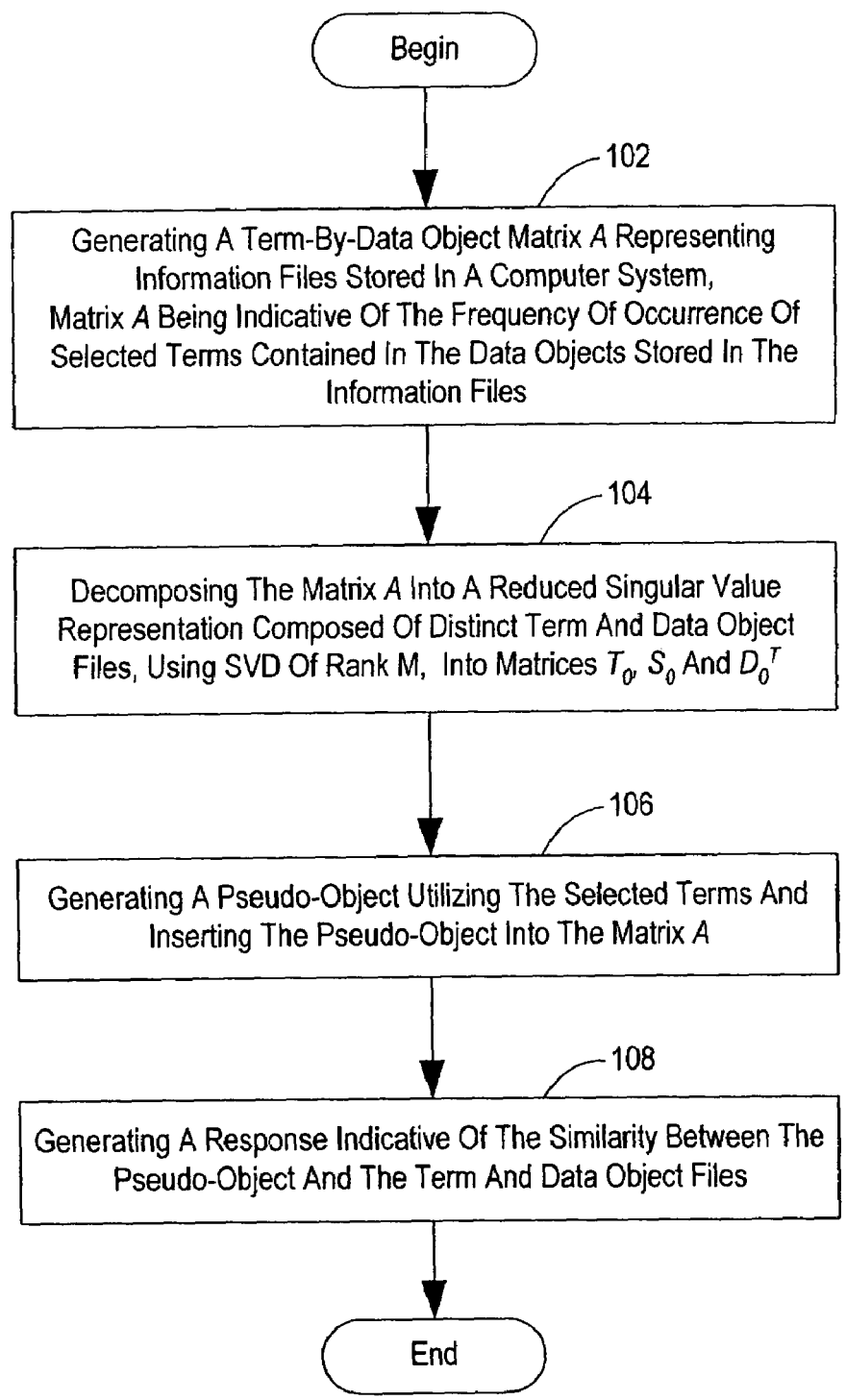
FIG. 1 is a flowchart representing a high-level process for using LSA for comparing the similarity of data objects in accordance with the prior art.

Other features of the present invention will be apparent from the accompanying drawings and from the detailed description which follows.

DETAILED DESCRIPTION OF THE INVENTION

As discussed above, term searching using Boolean logic does not always offer optimal retrieval results because traditional Boolean information retrieval techniques require the user to understand the subject matter and comprehend how the terms are used in the corpus of information to be searched. Search strategies must be adjusted to reflect contextual usage of the terms in the corpus of information.

Human understanding of terms might be based on both the synonomic and polysemic nature of term meanings. Synonomy refers to the notion that multiple terms may accurately describe a single object or concept, while polysemy refers to the notion that most terms have multiple meanings. Therefore, for a user to completely understand the subject matter of a corpus of information, the user must be aware of each and all synonomic uses of a term, while simultaneously recognizing that the occurrence of a term outside the realm of the context of the subject matter.

As alluded to above, using term expansion and thesauri techniques reduces the likelihood that a relevant document will be overlooked, expands queries and broadens the meaning of the terms. However, the use of term expansion and thesauri techniques may result in a large volume of documents being returned due to the polysemic nature of the query terms. Additionally, these differing meanings may ultimately depend on the subject matter, thus the user's familiarity with the subject matter remains necessary. These techniques help improve recall, but lead to a degradation of precision, but will also retrieve documents irrelevant to the original query, decreasing precision.

Ambiguities inherent to natural language, polysemy, is generally seen as the outgrowth of adapting terms from one context to another, sometimes with respect to unrelated environments. The prior art does not suggest an adequate remedy for the search precision being degraded by terms having multiple meanings. The solutions fall in two categories, controlling language in the corpus and structuring the corpus to account for term meanings. Controlling term usage in an information corpus is almost out of the question because of the burden placed on authors, not to mention the exclusion of very important legacy information. Additionally, certain terms may not adequately describe the subject matter of a document. However, limited success is possible via tightly controlled abstract and summary drafting, which are appended to documents in the corpus and often searched separately. The problem with structured information is that the hierarchy may have synonymous branches causing authors and users to index and search for documents in different branches.

Latent Semantic Analysis (LSA) provides a means for extracting and representing the contextual-usage meaning of words by statistical computations applied to a large corpus of text. Information content is defined by more than just its mere terms but is also characterized by the context in which a specific term is given. There is an underlying latent semantic structure in word usage that is partially hidden or obscured by the variability of word choice. An important concept is that the similarity of meaning of terms to each other is based on the context in which that term appears and the context in which that term does not appear. LSA determines similarity of meaning of terms by context in which the terms are used and represents the terms and passages by statistical analysis of a large information corpus.

LSA represents the terms taken from an original corpus of information or any subset of terms contained in the original corpus, as individual points in a high dimensional semantic space. A semantic space is a mathematical representation of a large body of terms, and every term, combination of terms or sub-combinations of a term can be represented as a unique high-dimensional vector at a point in semantic space. The similarity of two terms can be understood by comparing the terms' vectors. Quantitative similarity values are defined by the cosine of the angle between the term vectors representing the terms in the semantic space. More importantly, this comparison is valid only in the defined semantic space for the corpus of information.

LSA utilizes concepts rather than terms contained in the documents for analyzing the latent semantic structure of documents. Thus, LSA allows for information retrieval on the basis of concepts contained in the document with respect to other documents in the corpus rather than terms in the documents of the corpus.

Latent Semantic Indexing (LSI) is the application of LSA principles in a statistical information retrieval methodology. The application of LSI is advantageous over traditional search techniques, such as Boolean, because statistically representative information concepts based on the latent structure of the information relieves the user from being an expert on the mass of information in the corpus. Specifically, the user need not know or understand the concepts used by the original authors of the information in the corpus to accurately retrieve similar information from the corpus of information.

Artisans have understood that, even though intelligible information contains a bewildering variety of terms, associative possibilities, and multiple meanings per term and term use, certain inherent structures common to all languages can be identified. LSI focuses upon that inherent structure of language, specifically the relationship between documents and terms, to register recurring patterns of semantic structure. Co-occurrences of terms are given higher weights than singular occurrences because the object of semantic indexing is to recognize which terms reappear most often in which parts of a document's structure. It has been demonstrated that there are a few constantly recurring structural patterns within sentences and these patterns occur at the level in which terms and their articles interrelate. The recurrence of these patterns is "latent" because they are inherent in grammatical structure and "semantic" because they define linguistic contextual meaning. In other words, through the pattern of co-occurrences of words, LSI is able to infer the structure of relationships between articles and words that define context and meaning by the relationship between structure and concept.

FIG. 1 is a flow chart representing a high-level process for using LSI for comparing the similarity of data objects in accordance with the prior art. The process begins by generating a term-by-data object matrix (A) that represents the frequency of term occurrence in the data objects from an information corpus (step 102).

Each term in the information corpus is represented by a row in matrix A, and similarly, every data object is represented by a column in matrix A. Matrix A has a rank of m where $m \leq$ (minimum of terms and data objects). An individual entry in matrix A, say $j_i$, represents the frequency of the term i in data object j. Thus, the occurrence frequency of a selected term in a data object can be found in term-by-data object matrix A at the intersection of a data object column j and term row i.

Once term-by-document matrix A has been constructed, it is decomposed using a singular value decomposition (SVD) into two orthogonal matrices $T_0$ and $D_0^T$ containing term and data object vectors, respectively, and a diagonal matrix $S_0$ containing the "singular concept values" (step 104).

The SVD of a real h×l matrix A is the factorization; the general case is represented by the equation $$A=USV^T \quad (1)$$

Where matrices in this factorization have the following properties U [h×m] and V [l×m] are orthogonal matrices. The columns $u_i$ of $U=[u_1, \ldots, u_m]$ are the left singular vectors, and the columns $v_i$ of $V=[v_1, \ldots, v_m]$ are the right singular vectors. Additionally, S [m×m]=diag ($\sigma_1, \ldots, \sigma_m$) is a real, non-negative, and diagonal matrix. Its diagonal contains the so-called singular values $\sigma_i$, where $\sigma_1 \ldots \sigma_m$ 0.

Turning now to FIG. 3, a diagram representing a typical singular value decomposition of matrix A is depicted. Notice here that matrix A is a t×d dimensional matrix composed of document columns and term rows and is decomposed into the three smaller matrices identified above, $T_0$, $S_0$ and $D_0^T$. The terms matrix $T_0$, sometimes referred to as the left vector matrix, has dimensions of t×m, while the documents matrix, $D_0^T$, sometimes referred to as the right vector matrix, has dimensions of m×d. The singular value matrix, $S_0$, on the other hand, has the dimensions of m×m.

The singular value decomposition is useful for the numerical determination of the rank of a matrix. In exact arithmetic, a matrix A has rank m if A has exactly m non-zero singular values. Matrix notation used herein refers to matrix $Y^T$ or Y' as the transpose of matrix Y such that $YY^T=I$, where I is an identity matrix, obviously $Y'=Y^T$. Term vector matrix $T_0$ represents term-by-concept relationships inherent in the information corpus, while document vector matrix $D_0$ represents concept-by-data object relationships in the original information corpus. While multiplying $T_0$ times $S_0$ times $D_0^T$ yields the original matrix A ($T_0 S_0 D_0^T=A$), the number of dimensions derived from the SVD is usually reduced from m to k where k<m and ranges from 50-350 dimensions. This dimensional reduction is performed because many of the relationships are weak and the concepts are very small and not worth keeping. This reduced-dimension subspace is normally derived by selecting sub-matrices that correspond to the largest singular values and setting all other values to zero. This concept is diagrammatically illustrated with respect to FIG. 3 and FIG. 4.

Thus, the dimensional size of matrix $S_0$ is reduced from m×m to some value of k (two dimension size of k×k). Dimensional representation can be better viewed with respect to FIG. 4. Returning to the flowchart on FIG. 3, the reduction of concepts is performed by keeping only the k largest values in matrix $S_0$ where, of course, m is greater than k, and setting all other values in matrix $S_0$ to 0. In doing so, matrices $T_0$, $S_0$ and $D_0^T$ are reduced to forms T, S, and $D^T$, having dimensions of t×k, k×k and k×d, respectively, as can be seen in FIG. 4.

Once the concept reduction has been accomplished, multiplying T times S times $D^T$ yields a term-by-data object matrix Â ($TSD^T=Â$), with reduced term-by-data object matrix Â being slightly different than matrix A, but for the purposes of LSI, Â≅A. Reduced term-by-data object matrix Â is a mathematical representation of the semantic space for the original information corpus. So, the product of the orthogonal sub-matrices, T and D, and the largest singular values S forms a semantic subspace which approximates the original full term-data object space, reduced term-by-data object matrix Â.

Next, a pseudo-data object is generated from the selected terms used to construct matrix Â and is then inserted in matrix Â (step 106). The object here is to take a completely novel query, find a representative point for it in the semantic space, and then look at its cosine with respect to other terms or data objects in the semantic space. The new pseudo-data object must be in a form that is very much like the data objects of the matrices, A and Â, in that a pseudo-object must appear as vectors of terms. Thus, in order to compare a query or pseudo-data object, q, to other data objects, a term vector $A_q$ must be used for the derivation of a pseudo-data object vector $A_q$ used similarly with a row of $A_n$ for comparing data objects. The derivation is based on the fact that a real document $A_i$ should yield document vector $D_i$, where A=Â. It follows then that since:

$$A_q = TSD_q^T \quad (2)$$

because:

$$TT^T = I$$

such that:

$$D_q^T = S^{-1}T^T A_q \quad (3)$$

or $$D_q = A_q^T T S^{-1} \quad (4)$$

Finally, the similarity between query pseudo-data object vector $A_q$ and the other terms and data objects in the semantic space can be found by using a similarity metric (step 108). The prior art uses the cosine between query pseudo-data object $D_q$ and the document vectors represented in reduced term-by-data object matrix Â that represent data objects in the original information corpus for that metric. A cosine value of "1.0" would indicate that query pseudo-data object $D_q$ was superimposed on another document vector in the semantic space.

With regard to FIG. 2, a flowchart illustrating a prior art process for determining the similarity of documents and terms in a semantics base using latent semantic indexing is depicted. The process depicted in FIG. 2 is a lower-level representation of the latent semantic indexing process depicted in FIG. 1. The process begins with the preparation of a term frequency document matrix A for an information corpus (step 202). As discussed before, the term frequency document matrix A can be a tabular listing of document columns and term rows wherein the occurrence frequency of each term for a document is listed in the respective document column term row intersection. Essentially, a term frequency matrix can be thought of as the set of document vectors for documents contained in the information corpus. A document can be represented as a vector of terms (or keywords) that are meaningful words (i.e., conveys a content). Given a document, a compact list of terms in the document may be formulated by first removing stop words or non-content words such as "are, in, is, of, the, etc." Then, terms that have identical underlying roots, such as "troubling, troublesome, troublemaker, trouble, etc.," should be grouped to the unique word "trouble." Synonyms, such as "sole, only, unique," should also be grouped, and concept phrases should be grouped as single terms, such as "Information Highway," "Information Technology" and "Data Mining." Given the reduced set of terms, the number of times (frequency) each term occurs in a document is tabulated for the document.

Again, term frequency document matrix A has a rank of m (the value m being greater than or equal to the larger of the total number of documents or terms in the term-by-document matrix A). The process proceeds by preprocessing the term frequency document matrix A by using a singular value decomposition algorithm (SVD) (step 204). By applying the SVD to matrix A, the three sub-matrices produced are $T_0$, $S_0$, and $D_0^T$. As previously discussed, the $T_0$ matrix (having the dimensions t×m) describes the term-by-concept attributes of the semantics base, the $S_0$ matrix (having the dimensions m×m) describes the concept-by-concept attributes of the semantics base and the $D_0$ matrix (having the dimensions d×m) describes the concept-by-document attributes of the semantics base. Diagrammatically, the SVD of matrix A is represented in FIG. 3 as described above.

Next, the k largest values in the matrix $S_0$ are kept, thereby reducing the m×m matrix $S_0$ to a k×k matrix, matrix S, as are matrices $T_0$ and $D_0$ (step 206). Thus, the concept dimension is reduced for all three matrices forming T, S, and $D^T$, having dimensions of t×k, k×k and k×d, respectively, as can be seen in FIG. 4.

When matrices T, S and $D^T$ are recombined, a new, reduced term-by-document matrix Â is created. Because only the weakest concepts have been eliminated from the singular value matrix, matrix Â approximates the previous term-by-document matrix A (step 208).

Once term-by-document matrix Â has been constructed from matrices T, S and $D^T$, the semantic space defined by matrix Â can be examined for a number of similarity relationships between terms or documents in the information corpus. However, in addition to merely examining similarities between existing documents in the existing term frequency document matrix A, a pseudo-query may be created and inserted into term-by-document matrix Â (step 210). If the user chooses to create a pseudo-query to make a comparison of all documents $d_1$ to $d_n$ existing in the semantic space defined by term-by-document matrix Â, a pseudo-document vector $D_q$ must be created for a query document $d_q$, where $D_q = A_q^T T S^{-1}$ where $A_q$ is a document vector created from the term frequency for each term in $d_q$ that co-occurs in matrix A (step 212). In other words, what the user must actually create is a document column for query document $d_q$ where the frequency occurrence of each term listed in the original term-by-document matrix A is given in the respective cell when pseudo-document vector $D_q$ has been assembled i.e., document $d_q$ is inserted in the information corpus. Then, a similarity matrix can be computed for the pseudo-document vector $D_q$ versus all other documents in term-by-document matrix Â. This is possible because $ÂÂ^T = DS^2D^T$. The similarity of all documents in matrix Â can be defined, including the similarity to pseudo-document vector $D_q$. Still, on an individual document-by-document basis, for any two documents $d_i$ and $d_j$ of the form defined by matrix Â, the similarity can be compared by finding the dot product of the two column vectors which define the document, $D_i$ and $D_j$. Therefore, finding the similarity between the pseudo-document $D_q$ and any other document $d_i$ in matrix Â is simply a matter of finding the document product of column vector $D_q$ and any other column document vector listed in matrix Â, such as column document vector $D_i$ (step 214).

Returning again to step 210, if, on the other hand, the user does not intend to issue a pseudo-query, the user can compare each term or document within term-by-document matrix Â. Therefore, a check is made to determine whether a term similarity matrix is to be made for term comparisons (step 216). If a term comparison is to be made, a table is constructed exhibiting the relative similarity of each term to every other term in term-by-document matrix Â by $ÂÂ^T$ or $TS^2T^T$. The resultant term-by-term similarity matrix gives the relative similarities between every term and every other term in matrix Â. Again, computing the term-by-term matrices is a very exhaustive process and requires intensive processing power. Similarities between individual terms can be found by merely finding the dot product of the two row term vectors i.e., row term vector $T_i$ and row term vector $T_j$, corresponding to respective term $t_i$ and term $t_j$ being compared. For instance, similarity between the terms i and j can be found by finding the dot product between the two term row vectors, row vector $T_i$ and row vector $T_j$, which exist in matrix Â corresponding to terms $t_i$ and $t_j$, respectively. This product is actually a cosine between the term vectors $T_i$ and $T_j$, therefore as the value of the product approaches "1.0," the two terms are over one another in semantics space, and close in semantic similarity (step 218).

Returning to step 216, if the similarity between terms is not to be determined, then the user may instead use term-by-document matrix Â to determine the similarity between any two documents (i.e., document $d_i$ and document $d_j$.) The process again reverts to step 214 and proceeds as described exactly in the case of the pseudo-query. That is, a document-to-document table of similarities can be created by $ÂÂ^T$ or $DS^2D^T$, which defines the similarity of all documents in matrix A. Therefore, finding the similarity between any document $d_i$ and any other document $d_j$ is merely a function of following one or the other from one of the rows or columns to the other of the columns and rows and finding the value at the intersection point in the document similarity table for Â. Again, computing $Â^T$ is a very intensive process that requires extraordinary processing power and is highly dependent upon the size and complexity of the original document corpus. Finding the similarity between a few documents within the semantics space defined by matrix Â may be accomplished in a similar manner with respect to two terms. That is, finding the dot product between two column vectors, vector $D_i$ and vector $D_j$, that define the respective subject document $d_i$ and document $d_j$. For example, when comparing two documents (e.g., document $d_i$ and document $d_j$), the similarity between the documents may be found by the dot product of the two-column document vectors corresponding to the respective documents (i.e., column document vector $D_i$ and column document vector $D_j$, which are taken from matrix Â). Again, this product results in the cosine between column document vector $D_i$ and column document vector $D_j$. Therefore, as the product approaches "1.0," the documents are more similar.

As discussed above, the LSI process is extremely processing intensive and requires a new singular value decomposition to be performed each time a different document corpus is selected to be ranked, searched or documents therein otherwise compared. SVD of the term-frequency document matrix into left and right vector matrices and a singular values matrix is a bottleneck of the LSI process. SVD of the term-frequency document matrix simply cannot be performed efficiently for traditional LSI processes and negatively impacts the LSI process performance. Processing efficiency is inversely related to the size and complexity of the original document corpus; however, searching for similarities in large and complicated document sets is the major benefit of LSI. In other words, while it might be possible to reduce the size and complexity of a collection of documents, thereby realizing a corresponding reduction in complexity in computing and decomposing the term-frequency matrix, the benefit of the LSI process would be lost because other search processes may perform equally well on such collections.

LSI is most beneficial in ranking documents in a larger and more complicated collection of documents. However, once the term-by-document matrix A matrix has been decomposed by SVD, the reduced reconstructed term-by-document matrix Â merely presents concepts as a semantic space that is in better form for searching similarities between terms and documents.

In short, LSI is extremely processing intensive and may require frequent decompositions of a dynamic information corpus or one being searched with a variety of query documents. Therefore, in an effort to reduce the amount of preprocessing steps needed for a similarity search of either terms or documents in a semantic space, the present invention utilizes representative semantic analysis for preprocessing a semantic space.

One problem with LSI is that it is based on document occurrence. Decomposing a term-by-document matrix of a large information corpus can take days or even weeks because the time complexity is quadratic in the number of documents in the corpus to be processed. The SVD algorithm is $O(N^2k^3)$, where N is the number of terms plus documents, and k is the number of dimensions in the semantic space. Typically, k will be held small, ranging anywhere from 50 to 350. However, N expands rapidly with the number and complexity of documents in the information corpus (i.e., as the quantity of terms and documents increase). Thus, the SVD algorithm is extremely unfriendly for decomposing a large information corpus.

Moreover, each addition or deletion of a document in the information corpus requires that the corpus be reprocessed in order to accurately reflect the documents that may be recalled. Therefore, the SVD algorithm is unfeasible for a dynamic collection of documents that comprise an information corpus. Again, performing an SVD is much too time consuming to do on a regular basis.

With respect to the present invention, multiple collections of documents may be ranked, searched and/or otherwise compared for sets of matching documents without having to first generate and decompose a reduced term-by-document matrix Â for each entire collection of documents to be compared. Instead, documents in document collections are characterized by using a concept database. A concept database is a representative intelligence useful for the creation of a representative semantic space for comparing documents. The representative semantic space is not created from the documents in a collection to be compared, as in the prior art, but is used merely for projecting documents for making a comparison. The concept database consists of term and singular vector matrices which are products of the decomposition of a corpus of documents. The corpus of documents is that collection of documents selected as being representative of a similarity criteria related to document comparisons for the document collections. Thus, the concept database provides a mechanism for the creation of a representational semantic space for the placement of pseudo-document vectors that represent related similarity criteria, without having to decompose a reduced term-by-document matrix Â for the entire collection of documents. Therefore, the process of searching a collection of documents is condensed to the steps of creating a concept database from which a document database is created using a collection of documents to be searched and searching the document database. Searching the document database may be accomplished similar to that process described above using term or document vector matching. However, searching might be further optimized by relying on term or Boolean searching to further reduce the size of the document database prior to matching (pseudo) document vectors. Therefore, in accordance to one exemplary embodiment of the present invention, searching the document database includes a two-part query: term searching and matching (pseudo) vectors, either document or term pseudo vectors.

Figure 5:
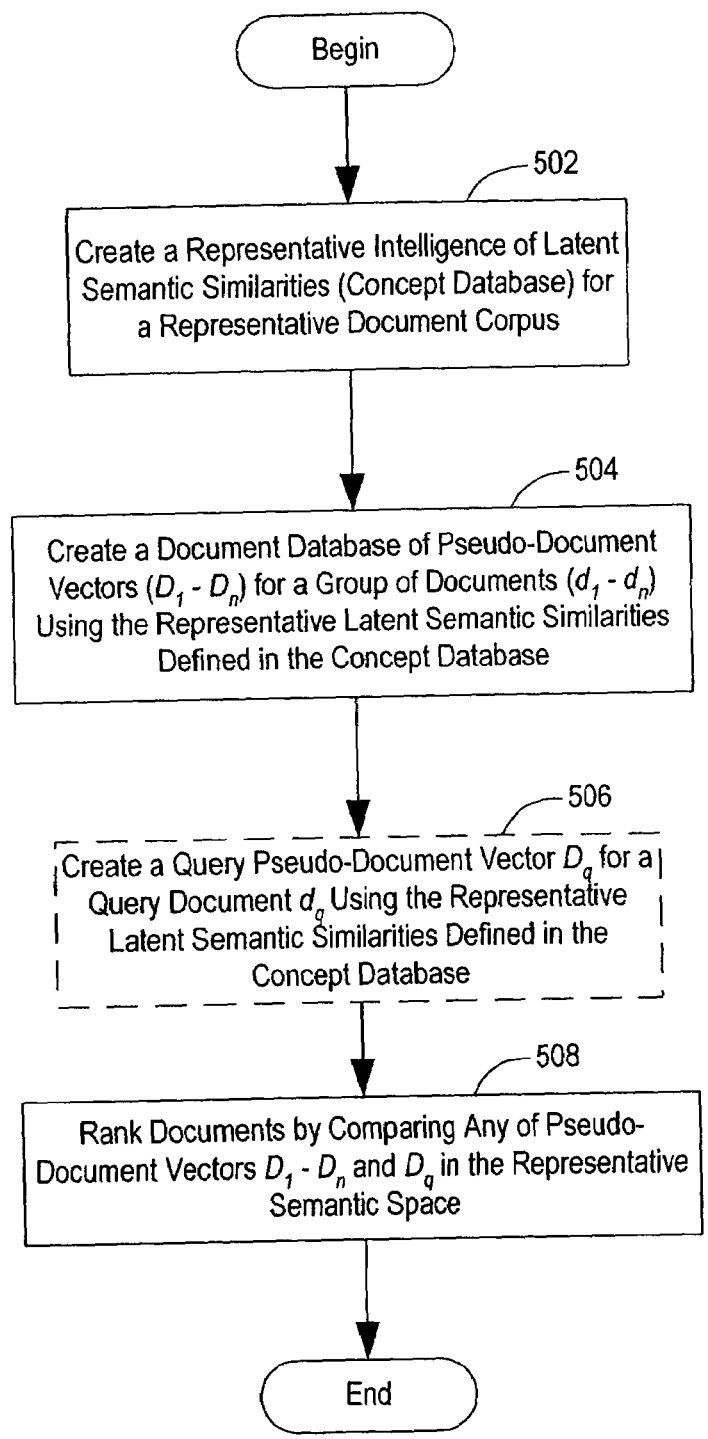
FIG. 5 is a flowchart depicting a high-level process for representative semantic analysis in accordance with an exemplary embodiment of the present invention.

The present invention may be better understood by paying particular attention to the flowchart depicted in FIG. 5 depicting a high-level process for representative semantic analysis in accordance with an exemplary embodiment of the present invention. The process begins by creating a representative intelligence for defining a representative semantic space based on representative latent semantic similarities from a representative document corpus (step 502). The representative intelligence is referred to herein as a concept database. Initially, a representative corpus of documents is compiled based on similarity criteria and used as a sample of the intelligence of the subject documents and databases to be compared. Although not immediately apparent, a representative semantic space defined by similarity criteria for the documents making up a corpus is at least partially based on latent semantic similarities inherent in those representative documents. Thus, similar documents, databases with similar documents and even query documents that are similar to the documents in the corpus can be projected into the representative semantic space and compared based, at least partially, on their latent semantic similarities.

The concept database is constructed from a corpus of representative documents (e.g., document $d_i$ to document $d_d$), wherein the corpus contains exactly d number of documents. While the corpus might include some of the documents to be compared, optimally the concept database is created from a corpus of documents selected for reliably representing similarity criteria which form the basis for document comparisons. The actual documents to be compared may not have been identified at the time the document corpus is compiled and the concept database is created therefrom. Similarity criteria refer to the parametric attributes that define comparison metrics applicable to a representative semantic space. In other words, similarity criteria refers to the document attributes that will be used for making document comparisons. For example, similarity criteria may be as uncomplicated as specifying a document type, or alternatively may be as complicated as defining a hierarchy of attributes and parametric values used to characterize document similarity.

The concept database consists of two matrices, S and T, found by decomposing a term-by-document matrix for the document corpus and a dictionary of weighted terms in the corpus.

By using the contents of the concept database, any collection of documents related by the similarity criteria used to compile the original document corpus can be compared without SVD to that collection. Instead, comparing a collection of documents merely involves creating a document database for documents in a collection to be compared. Returning to the flowchart depicted in FIG. 5, the concept database is used to create a document database of, inter alia, pseudo-document vectors for a group of documents to be searched (step 504). The creation of the present document database for the representative semantic analysis represents a significant departure from prior art LSI processing. It should be understood that the document database, while serving a similar function as the document matrix D, is not a document matrix D because the collection of documents to be compared is never decomposed. Recall that typically the prior art LSI process decomposes a term-by-document matrix (derived from the collection of documents to be compared) into a term-by-concept matrix T, a concept-by-concept matrix S, and a concept-by-document, document matrix D. The document matrix D is the most important matrix of the three matrices and is used primarily for comparing documents according to the prior art. Thus, each time a new document is added to the collection of documents, the collection must be reprocessed using, for example SVD, and a new document matrix D created for comparisons. By contrast, the document matrix D is not used in the present representative latent semantic analysis search. Instead, only the term vector matrix T and the singular value matrix S are used to build pseudo-document vectors for collections of documents to be compared which are included in the document database.

In other words, one departure from prior art LSI is that the document matrix D produced from the singular value decomposition of the corpus is never used to make document comparisons. Therefore, the database of documents to be compared need not be arranged in a term-by-document matrix for singular value decomposition, and then decomposed as is typically performed with LSI processing. This represents a significant saving in processing power and optimizing the searching process without any substantial reduction in accuracy for defining the similarity between terms and documents in the semantic space.

A second departure from the traditional LSI processing is more conceptual and relates to the definition of the semantic space used for making document comparisons. The document matrix D of the prior art LSI processing is decomposed from the actual documents to be compared; therefore, the LSI semantic space defined by the document matrix D is created from actual concepts existing in the collection of documents to be compared. By contrast, the semantic space defined by the document database is not created from the document collection, but is instead created by application of the concept database to the document collection. Therefore, the semantic space used for comparing documents in the document database is defined by the similarity criteria used to compile the document corpus rather than the documents in the collection. The semantic space used for comparing documents in the present invention, on the other hand, is merely a representational semantic space since the document corpus is compiled with documents representing a similarity criteria.

According to exemplary embodiments of the present invention, a document database is a dynamic collection of documents, which presents an interface that allows documents to be added, deleted and compared simultaneously. Each document stored in the document database consists of one or more fields containing the text of the document and associated meta-data. The data in each of these fields are stored in the document database, as well as a field index corresponding to each field. In addition, for each field containing textual data, an inverted index is maintained, which maps all terms appearing in every document to the documents in the document database. Unlike the weighted term dictionary in the concept database, the inverted index contains all distinct terms occurring in the documents, including stop words. Finally, the document database contains an additional database with a set of pseudo-document vectors, each of which represents a unique document in the document database.

Thus, in stark contrast with the prior art LSI processing, documents are added to a document database for comparisons without decomposing the document database prior to making document comparisons. Additionally, document may be deleted from the document database without decomposing the document database prior to making document comparisons. Thus, a query document $d_q$ may be easily added to the document database for making a comparison and then deleted prior to making any other document comparisons. Therefore, using the concept database a query pseudo-document vector can be created for a query document (step 506).

Once the document database of pseudo-document vectors has been compiled, a term-by-document matrix $\hat{A}$ can be produced and from that, a table of similarities between documents can also be produced, as discussed above, from the product of $DS^2D^T$ for ranking documents in the document database (step 508). If query document $D_q$ is used, it is inserted in the document database and the documents in the document database are ranked with respect to the query pseudo-document vector in accordance with the product of $DS^2D^T$.

Figure 6:
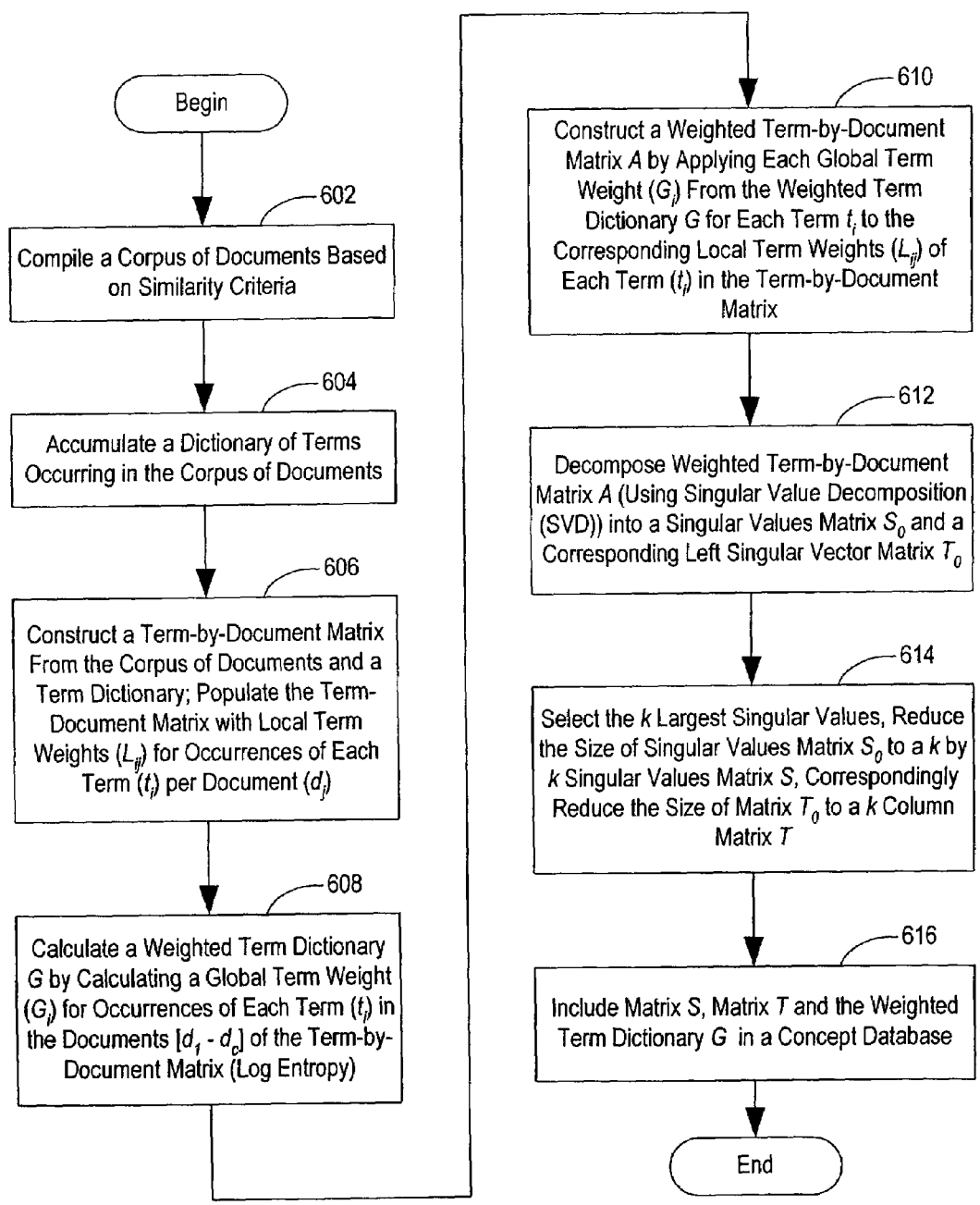
FIG. 6 is a flowchart representing a process for creating a concept database in accordance with an exemplary embodiment of the present invention.
Figure 7A:
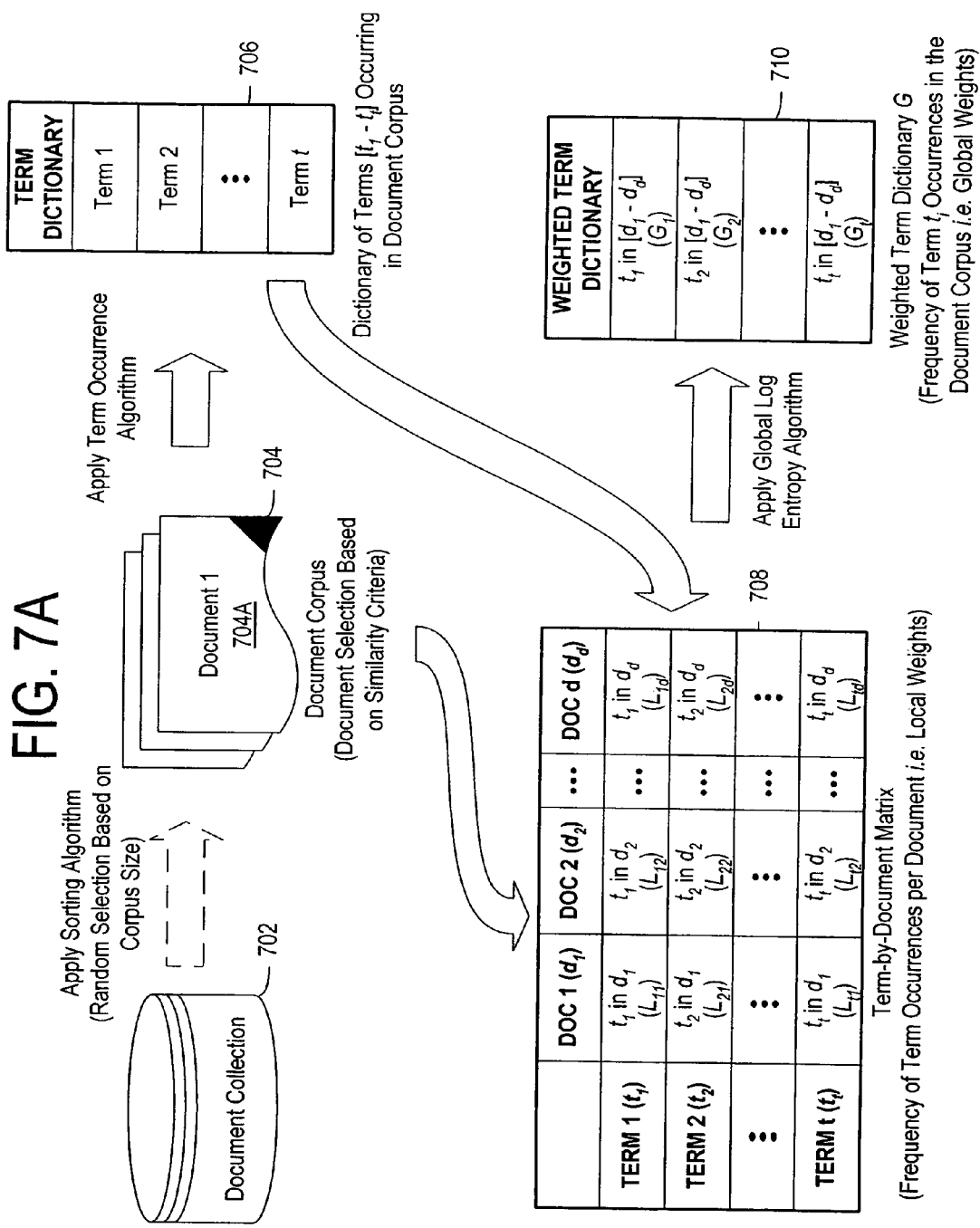
FIG. 7A is a logical diagram illustrating the compilation of a term-by-document matrix and a weighted term dictionary in accordance with an exemplary embodiment of the present invention.
Figure 7B:
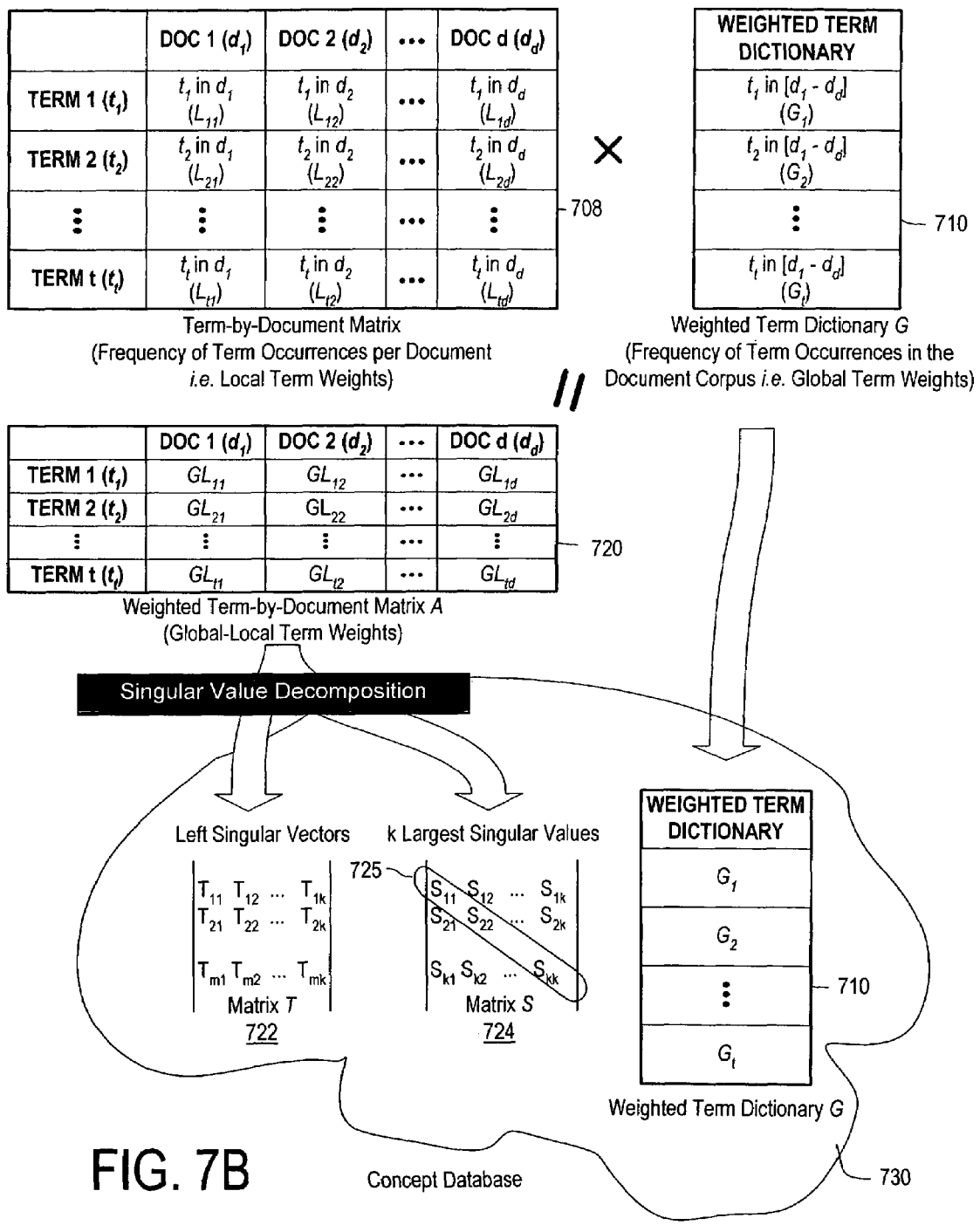
FIG. 7B is a logical diagram depicting the steps necessary for converting the term-by-document matrix and weighted term dictionary G into the components of the concept database necessary for performing representative semantic analysis in accordance with an exemplary embodiment of the present invention.

The process for building a concept database will be particularly described with respect to the flowchart depicted in FIG. 6 and the logical diagrams illustrated in FIGS. 7A and 7B in accordance with an exemplary embodiment of the present invention. As mentioned above, concept database 730 comprises two matrices, matrix T 722 and matrix S 724, and a dictionary of weighted terms G 710.

The process begins with the selection of a corpus of documents having similar subject matters (step 602). The corpus of documents 704 may be large or small, but a larger corpus may yield better results due to a larger variety of term concepts being represented within the corpus. Building a concept database begins with selecting an appropriate document corpus, such as from document collection 702. Document corpus 704 is a representative sample of documents which is based on a similarity criteria to be used for a search and contains exactly d number of documents.

Similarity criteria refer to the parametric attributes that define similarities in a representative semantic space with regard to documents. Similarity criteria may be as uncomplicated as the particular document type, or alternatively, may be a complicated hierarchy of attributes and parametric values associated with document similarity. For instance, a corpus of documents might be compiled based on similarity criteria involving a particular document type, such as a United States issued patent. Other predetermined document attributes might be defined for compiling the document corpus include a broad statement of the subject matter of the issued patent or the technology area such as the subject matter of computer-implemented technologies. Other document attributes might further refine the subject matter, such as one of three-dimensional graphics, information technology, or data compression. An exemplary document corpus based on the similarity criteria for U.S. issued patent document types related to information technology would comprise only U.S. issued patents related to information technology. The similarity criteria may be narrowed even further by specifying other parametric attributes, for example, such as a category of information technology, such as database recovery, interface engines or search engines. In that case, an exemplary document corpus might comprise only U.S. issued patents related to search engines, which is a category of information technology. A representative semantic space defined by such similarity criteria would be useful for comparing U.S. issued patents related to search engines or for searching databases of U.S. issued patents for documents similar to U.S. issued patents directed to search engines or, alternatively, even searching more general databases for documents similar to U.S. issued patents directed to search engines.

Therefore, if databases to be searched contain documents on Object Oriented Programming (OOP), then the representative document corpus should be compiled on the basis of a similar subject matter criteria. That is, the document corpus should be comprised of documents pertaining to the subject of OOP processing.

While document corpus 704 is a representative sample of d number of documents, that sample may be compiled from different document sources without varying from the intended scope of the present invention. In accordance with one exemplary embodiment, document corpus 704 is optionally compiled directly from document collection 702 which is the subject to an initial document comparison. In that case, the representative semantic space is defined by the similarity criteria of the document collection, similar to traditional LSI processing. However, since the present method utilizes only a representative semantic space, document collection 702 may be condensed from c number of document to a smaller number, d, of representative documents for corpus 704. Reducing the number of documents in document corpus 704 greatly accelerates the representative semantic analysis process without sacrificing precision in the document comparison. One method of condensing document collection 702 is to sort the collection using a random selection algorithm (note the process arrow from document collection 702 and document corpus 704 is dashed indicating that the step is optional). Another method is to manually sort document collection 702 for the first d number of documents that accurately represents a predetermined similarity criteria. However, as mentioned above, documents in the document corpus need not be identical to the documents that will be compared or searched, but instead are used only for creating a concept database for defining a representative semantic space in which pseudo-document vectors for documents in a collection to be compared are projected.

Thus, while in accordance some exemplary embodiments of the present invention, the documents in the corpus may be subsequently vectorized and included in a document database for making document comparisons, it is not necessary to do so. If fact, the primary purpose for compiling the document corpus 704 is for the realization of a representative semantic space which is inherently based on representative latent semantic similarities attributable to the d number of representative documents in the corpus. Once document corpus 704 is compiled, the documents in the corpus are of no further value in defining the representative semantic space and are discarded. Moreover, because the document corpus is merely a representative sample of documents that conform to a predefined similarity criteria, the actual documents used for compiling the corpus are relatively unimportant. The documents themselves merely represent the predefined similarity criteria with which the semantic space is defined.

Therefore, in accordance with other exemplary embodiments of the present invention, document corpus 704 is compiled for documents that are not included in the document collection to be compared. Representative documents are compiled from any source based on predetermined similarity criteria. In practice, document corpus 704 may be compiled rather expeditiously for less complicated similarity criteria such as document type. For example, documents directed to media broadcasts may be compiled into a document corpus by merely collecting media documents of the type media to be compared. If too many equally relevant documents are gathered, then a sorting algorithm may be employed as described above for randomly selecting documents based on the optimal size of the corpus. More complicated similarity criteria may require an operator to manually sift though relevant documents to identify the most representative of a predetermined similarity criteria. However, in accordance with an exemplary embodiment, a client, rather than a skilled operator, may best understand which documents are representative of similarity criteria without fully understanding how to articulate exactly what parametric attributes are desired. In that case, the client may compile a valid document corpus of representative documents from which document comparisons may be based. In such cases, a corpus of documents may be compiled by a client who has no understanding whatsoever of the present process.

It should be understood that the representative semantic analysis process of the present invention is largely a mathematical process, of which compiling a document corpus is the primary non-mathematical step. Compiling the document corpus is the primary step where understanding the similarity criteria plays a role. Therefore, should a corpus of documents be provided beforehand, the representative semantic analysis process can make document comparisons essentially automatic. Moreover, because the documents in a document corpus and in a document database to be compared are implemented in software document codes, the only requirement is that the document codes be equivalent. Therefore, accurate document comparisons may be made where the subject documents are in a language which is foreign to the operator so long as a document corpus has been provided and the foreign language documents are all implemented in a matching document code.

Document database 702 is considered to be the corpus of the subject matter to be searched and may be reduced in size by applying a sorting algorithm. The sorting algorithm, for instance, a random selection algorithm, reduces the number of documents in the document database by randomly selecting documents to populate document corpus 704. Here, it is important to understand that the more documents in document database 702 have the advantage of presenting terms within the documents in a varied of semantic context. However, it has also been discussed that too many documents in the information corpus do not increase the accuracy of the search results beyond a distinguishable amount. Using smaller databases tend to lessen the number of contextual concepts that can be represented by the term-by-document matrix. In practice, it has been discovered that the optimum value for d (the quantity of similarity criteria related documents in an information corpus) is greater than 5,000 documents, where each document contains between 1-Kilobyte and 64-Kilobytes of text. Similarly, selecting a document database which contains an extraordinary number of documents not closely related to the similarity criteria to be searched will result in the reduction of the number of contextual concepts represented in term-by-document matrix A that are important for discovering similarities between documents within a given subject matter. Thus, it may be expected that the accuracy of the search results will be lowered due to the extraordinary number of documents in document database which are not closely related to the similarity criteria.

Returning to the process depicted in FIG. 6, a dictionary is created which comprises all t number of terms occurring in the d number of document in the corpus (i.e., dictionary 706 (step 604)). Indexing each and every term is not necessary and may lower the overall efficiency of the representative semantic analysis process because some terms have little or no meaning with respect to the similarity criteria and yet have extremely high occurrence frequency. For instance, stop words (e.g., "a," "and" and "the") might all be eliminated from the dictionary of terms. In practice, once a document corpus 704 has been assimilated, a term occurrence algorithm can be applied to the documents of document corpus 704 for creating term dictionary 706. The term occurrence algorithm may have a number of forms. For example, it may optionally eliminate stop words and/or may attempt to reduce terms to their root form. Additionally, the term occurrence algorithm may also implement other specialized rules for forming dictionary 706. It may be the case that a particular term has a contradictory or misleading meaning which would tend to skew the concept analysis of the term. With respect to a document comparison directed to OOP, the term "object" is an extremely important concept when trying to describe object oriented programming concepts. However, if the collection of documents to be examined is a collection of documents which represents issued patents, the term "object" also conveys a meaning of the purpose of the patent or subpart of the patent. Thus, in that context, the term "object" specifically relates to the subject matter of patentability rather the subject matter of object oriented programming.

Alternatively, the term occurrence algorithm may exclude terms from the term dictionary that do not occur more than a predetermined number of times in the corpus. Normally, terms that do not occur more than a threshold number of times occupy a space in the term dictionary. Since each term in the term dictionary occupies a row in the term-by-document matrix A, low occurrence terms also have a row in matrix A as does any other term. However, terms with an extremely low number of occurrences in the corpus cannot participate in the formation of stronger concepts due to their particularly low occurrence of frequencies. Therefore, in accordance with another exemplary embodiment, the occurrence algorithm allows for an artificial threshold to be predetermined for term occurrences in the corpus. Terms that do not occur the predetermined number of times in the corpus are excluded from the dictionary, and therefore are also excluded from the term-by-document matrix A. Excluding terms with extremely low occurrences optimizes the decomposition process by eliminating rows in the term-by-document matrix A devoted to terms that do not participate in forming stronger concepts, while not affecting the quality or character of the decomposed matrices. The predetermined threshold amount is from one to four occurrences in the corpus, but as a practical matter has been set at three for various sized corpuses with exceptional results. Ultimately, dictionary 706 will contain t number of terms that are also contained in the documents in document corpus 704 (i.e., term $t_l$ through term $t_t$, and each of terms $t_l$ through $t_t$ may have some semantic relationship to the similarity criteria used to compile the corpus).

Next, a term-by-document matrix 708 is constructed from document corpus 704 and term dictionary 706 (step 606). Here it is understood that term-by-document matrix 708 for the representative semantic analysis process of the present invention is fundamentally different from the term-by-document matrix created for LSI processing. Documents in the representative term-by-document are selected to represent a similarity criteria related to document comparisons, while traditionally documents for a LSI term-by-document matrix were those used in the actual document comparisons.

Term-by-document matrix 708 is populated with local term weights L for the terms in the term dictionary 706 (e.g., term $t_l$ through term $t_t$) such that $L_i$ represents the frequency of occurrence of each unique dictionary term $t_i$ in a unique document $d_j$ in which the term occurs. Because term-by-document matrix 708 is populated with document information from document corpus 704 and that information is representative of similarity criteria (and not necessarily the document to be compared), term-by-document matrix 708 is also referred to as a representative term-by-document matrix. Normally, documents represent columns and terms represent rows; however, one of ordinary skill in the art would understand that the term-by-document matrix can be presented in anyone of a number of presentation formats provided that the format is maintained throughout the remainder of the concept database building process. Dictionary terms and document nomenclatures are typically arranged in the representative term-by-document matrix 708 such that the occurrence frequency of a term $t_i$ in a document $d_j$ is found in the entry at the intersection of the term $t_i$ row and document $d_j$ column. Essentially, representative term-by-document matrix 708 is a tabular listing of term occurrences by document and thus the indices in a matrix are document-local term weights $L_i$ (or simply local term weights). When examined by document, the representative term-by-document matrix is a collection of document column vectors, wherein each column is a vector representing a unique document $d_j$ in the corpus 704 and each index is a coefficient representing occurrences for a dictionary term in the document. In a similar manner, when examined by term, the term-by-document matrix is a collection of term row vectors, wherein each row is a vector representing occurrences of dictionary term $t_i$ by document.

From the term-by-document matrix, a weighted term dictionary G 710 is constructed by calculating the global term weight for each term in the term-by-document matrix (step 608). Terms in dictionary 706 are then weighted based on information theory and statistical practices (i.e., log entropy and local and global weighting schemes) converting term dictionary 706 into weighted term dictionary G 710. In practice, terms occurring in term dictionary 706 are globally weighted based on a term's cumulative occurrences in the d number of documents (e.g., document $d_l$ through document $d_d$) of document corpus 704. Term dictionary 706 is modified to hold the global term weights $G_i$ to form weighted term dictionary G 710. Global term weight $G_i$ is determined by the occurrences of each term $t_i$ in documents $d_l$ through $d_d$ of term-by-document matrix 708 (or similarly in document corpus 704).

A weighted term-by-document matrix A 720 is then created from the weighted term dictionary G 710 and the representative term-by-document matrix 708 by applying the term weighting function to the representative term-by-document matrix 708 (step 610).

Having constructed the weighted term-by-document matrix A 720, a singular values matrix $S_0$ and a corresponding left singular term vector matrix $T_0$ are decomposed from weighted term-by-document matrix A 720 using anyone of a number of decomposition algorithms such as a singular value decomposition (step 612). Actually, matrices $S_0$, $T_0$ and a third matrix, document matrix $D_0$, are decomposed from weighted term-by-document matrix A 720 as described above with respect to FIGS. 3 and 4. However, as the purpose of constructing concept database 730 is for defining a representative semantic space in which related documents may be compared, the document matrix $D_0$ is of no use and is immediately discarded as it is not needed for the representative semantic analysis.

While the present invention is described using the singular value decomposition algorithm for decomposing the weighted term-by-document matrix A 720, other decomposition algorithms are equally well known and reap acceptable results. One of ordinary skill in the art would immediately recognize that other decomposition algorithms are available, such as semi-discrete decompositions and UL V decompositions.

The dimensional size of singular value matrix $S_0$ is reduced by selecting the k largest singular values 725 which represent the concepts in the representative semantic space (step 614). In accordance with an exemplary embodiment of the present invention, the value of k is normally set between 250 and 400, having an optimum value of approximately 300.

In addition to reducing the size of singular value matrix $S_0$ to reduced singular value matrix S, the size of the term vector matrix, $T_0$ is also reduced to k columns in accordance with the reduction, thereby forming reduced term vector matrix T. The singular values in matrix S 722 are ordered by size for the m concepts from weighted term-by-document matrix A 720. Only the k highest ranking concepts 725 are used for defining the representative semantic space, which are identified in matrix S 724. A reduced term-by-document matrix Â is then realized from the first k largest concepts are kept from matrix S 724. This is accomplished expeditiously by merely setting the smaller concept values in the S matrix to zero (i.e., concepts ranked lower than k, between the $k^{th}$ and $m^{th}$ values). Then, the S and T matrices are truncated to the k concepts; matrix S becomes a k×k matrix with k non-zero entries and matrix T becomes a m×k matrix. As a practical matter, the matrix A is decomposed for the $k^{th}$ highest singular values and the decomposition is then terminated because the $k^{th}$ through $m^{th}$ singular values will be truncated in the concept reduction.

The values of the decomposition product, matrix S and T matrices, are the means for defining a representative semantic space for comparing documents by the similarity of their latent semantic concepts. Accurate S and T matrices are more important for representative semantic analysis than standard LSI searching because the representative semantic space is representative of the concepts in the collections of documents to be searched. The present invention relates to an optimization over traditional LSI searching methods, so selecting an efficient SVD process is significant for achieving overall optimized results.

The present invention does not rely on SVD for finding a document matrix D because documents in document matrix D are not compared to one another. Moreover, the document vectors defined in the row vectors of the document matrix D are not properly defined in the domain of the representative semantic space defined by concept database 730. Concept database 730 defines a representative semantic space which is then used for comparing one document to another as described further below, whether or not the document was a part of the document corpus used for the SVD. Each document in a document database to be compared is placed in a document vector form similar to that illustrated above with respect to weighted term-by-document matrix A 720. Therefore, in addition to needing the frequency occurrence values of terms in term dictionary 710, which occur in the document to be searched, the global weights $G_i$ for terms' occurrences in document corpus 704 are also needed. Thus, in addition to the left singular term vectors T and the k largest singular values S, term dictionary 710 is also included in concept database 730 which includes the global weights of each term with respect to document corpus 704. Thus, concept database 730 is realized from the reduced singular values matrix S 724, reduced the term vector matrix T 722 and the weighted term dictionary G 710 each from the similarity criteria used to compile representative corpus 704 (step 616). The process then ends.

Figure 8:
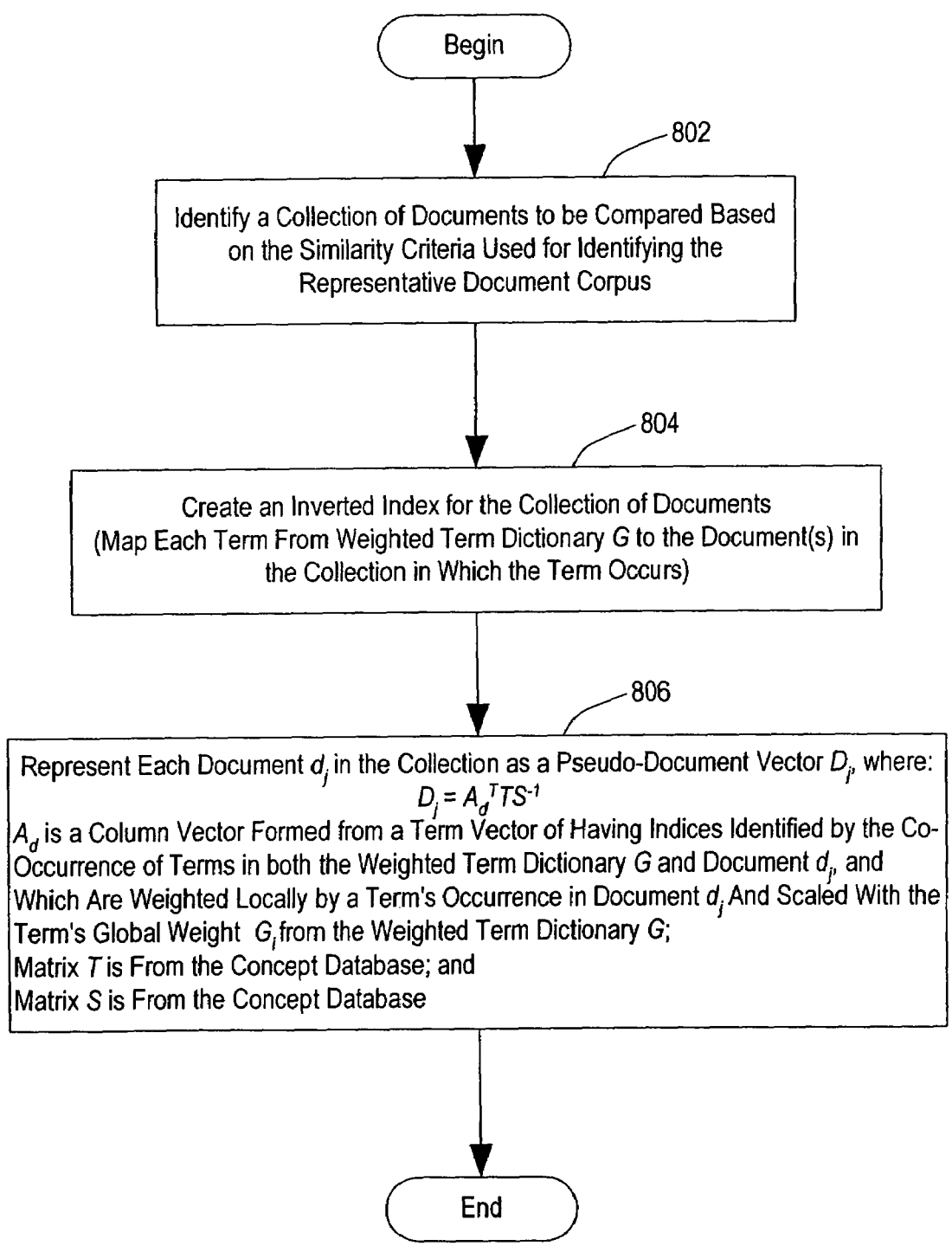
FIG. 8 is a flowchart depicting a process for creating a document database in accordance with an exemplary embodiment of the present invention.

FIG. 8 is a flowchart depicting a process for creating a document database in accordance with an exemplary embodiment of the present invention. This process is represented as step 504 representing semantic analysis processes depicted in FIG. 5. In practice, the document database consists of a set of documents represented by the document field data, field indices, inverted indices and pseudo-document vectors that represent the documents in the document database. Associated with the compressed set of documents is an index of unique internal doc-IDs mapped to a user-defined document field and associated field index that maps the user-defined field to the unique internal doc-ID.

The process begins by identifying a collection of documents to be searched (step 802). For best document comparison results, the similarity criteria of the collection of documents should be related to that used to compile the representative document corpus. The more askew the similarity criteria of the two databases, the less reliable the similarity results are between documents or terms because the comparison of document vectors must be performed in an appropriate semantics space. More precisely, pseudo-document vectors for the collection of documents are compared in the representative semantic space which produces an indication of the similarity between documents. Document vectors that are not created from SVD of the original information corpus are called 'pseudo-document vectors' because they present themselves as vectors of terms rather than a SVD product.

LSI ensures that the semantic space used for comparing document vectors is the appropriate space for making comparisons by always using document vectors from the document vector matrix D returned from the decomposed corpus of documents. In doing so, the multidimensional semantic space created by LSI is defined around the semantic concepts in the information corpus. All document vectors representing documents in the information corpus will map to that semantic space and therefore similarity metrics can be properly applied to the document vectors. The present invention avoids the task of continually computing a SVD of new collections of documents by preprocessing a representative semantic space. The representative semantic space can then be used for comparing the similarity of documents having comparable subject matters to the subject matters of the information corpus used to create the concept database. The subject matters constraint must be rigorously enforced because latent semantic concepts inherent in the information corpus are a result, at least partially, of the subject matters of the corpus. So, for a similarity metric to properly apply to pseudo-document vectors, the multidimensional semantic space must be appropriate for mapping the vectors. The suitability of the semantic space to the pseudo-document vectors is ensured by limiting the realm of the semantic space similar semantic concepts (i.e., by constraining the similarity criteria).

Returning to the process depicted in FIG. 8, an inverted index is constructed that maps each term from the collection of documents to the documents in which that the term appears (step 804). The inverted index contains all terms occurring in the collection of documents including all stop words, unlike the weighted term-by-document matrix 720 in FIG. 7B that excludes stop words.

Once the inverted index has been constructed, each document in the collection is represented as a pseudo-document vector $D_j$, where $D_j = A_d^T T S^{-1}$ (step 806). Here, $A_d$ is a column vector formed from a term vector created from terms co-occurring in the weighted term dictionary G and in the document $d_j$ to be represented as a pseudo-document vector. Also note that at this point, all co-occurring terms in term vector $A_d$ are weighted locally by a term's occurrence in document $d_j$, local weight $L_i$, and then scaled by the global weight of the term taken from term dictionary G, global weight $G_i$. Matrices T and S are the term vector and singular value matrices respectively taken from the concept database. Once each document in the collection of documents to be searched is represented as a pseudo-document vector $D_j$, a reduced term-by-document matrix Â can be compiled from the pseudo-document vectors as discussed above with respect to previous embodiments. From there, the product of $\hat{A}\hat{A}^T$ or $DS^2D^T$ defines an index of similarities from document-to-document in the collection of documents to be searched.

By using the inverted index and the pseudo-document vector in the document database, any document $d_i$ of the c number of documents in the document collection may be compared to any other document $d_j$ in the document collection. Moreover, a subset, $S_l$, comprising $s_l$ number of documents of the c number of documents in the document collection may first be sorted using the inverted index and then the documents in subset $S_l$ compared using pseudo-document vectors as described above. The inverted index is searched using Boolean logic, or any conventional search technique, to reduce the quantity of the pseudo-document vectors comprising the subset $S_l$ to be compared, from the c number originally in the document collection to sl more relevant documents in subset $S_l$. Thus, more accurate results may be achieved. For example, narrowing a search between a set of dates, or constraining the set of results to those containing specific keywords eliminates documents not meeting the search criteria and those documents will not be ranked. In cases where a purely conceptual match is not desired, the added ability to require that a document have certain words is extremely beneficial because only documents containing the specified words are ranked by their vector similarity. An added benefit is that the reduction in the number of similarity comparisons to be made as a result of performing field and/or keyword queries reduces the computational requirements.

Figure 9:
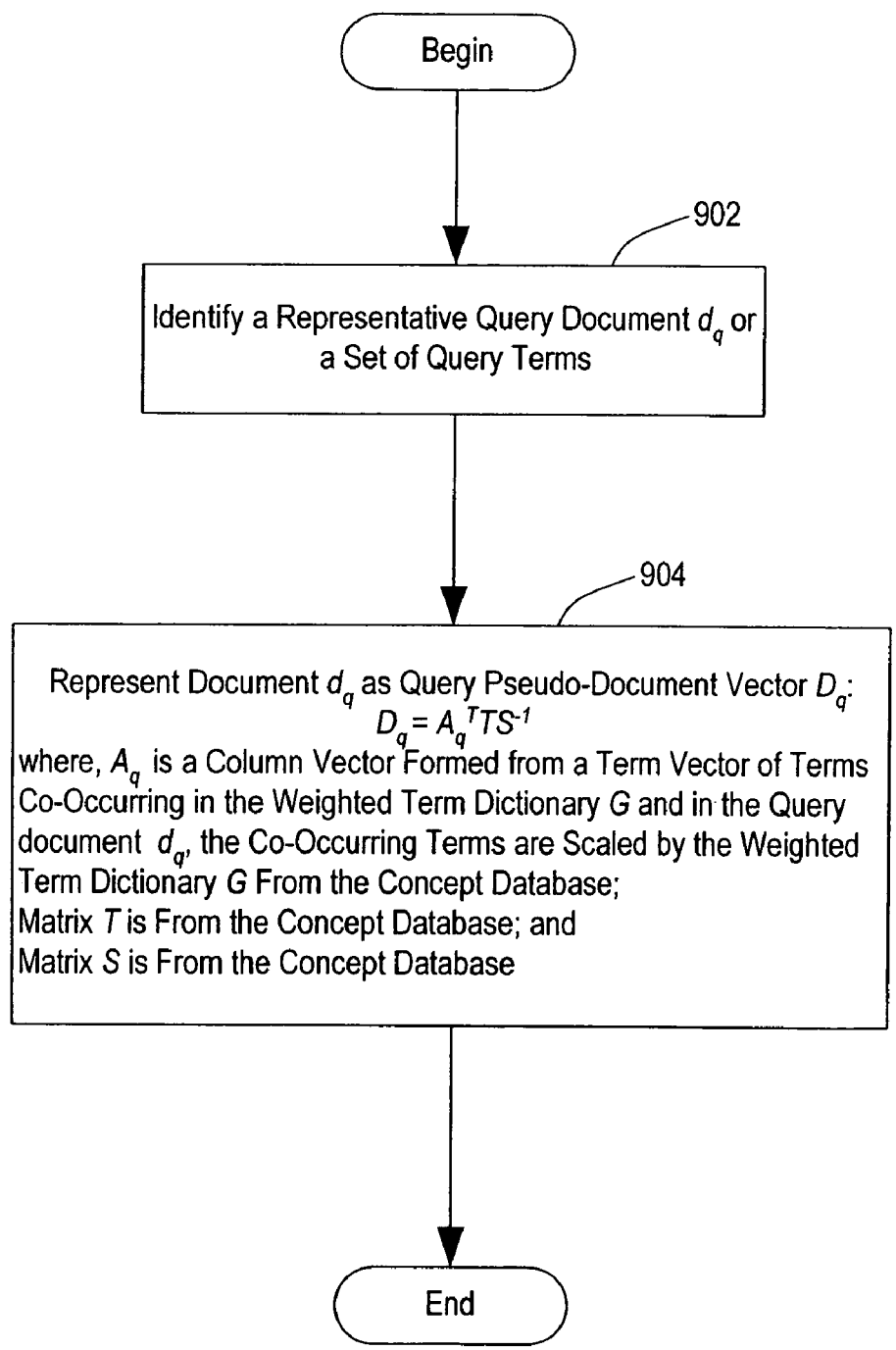
FIG. 9 is a flowchart depicting a process for creating a query pseudo-document vector in accordance with an exemplary embodiment of the present invention.

Of course, in many instances, the purpose of performing the document search is not for comparing one document within a collection of documents to another document within the same collection, but instead to find the most similar document in the collection to a query document. One of ordinary skill in the art would readily understand the query document may be representative of documents that are desired or mainstayed and be merely a series of query terms used to convey a central idea which is paramount to the search strategy. FIG. 9 is a flowchart depicting a process for creating a query pseudo-document vector in accordance with an exemplary embodiment of the present invention. Recall that the purpose for placing the query pseudo-document in the representative semantic space with other pseudo-documents in an effort to find the most similar document as represented within that semantic space. Therefore, the query pseudo-document vector must be constructed using the same parametric attributes as those used for constructing the semantics base itself (i.e., the similarity criteria of the original corpus of documents). Thus, it would be unlikely to expect accurate search results from a query document which was outside the similarity criteria of the original corpus of documents. Hence, the first constraint similar to building the document database is that the query document pertains to a similar subject matter as both the original corpus of documents and the newly-created document database.

The process begins by identifying a representative query document or alternatively, a set of query terms (step 902). Again, this document or these terms must pertain to the original subject matter of the original corpus of documents. Finally, the query is represented as a pseudo-document vector $D_q$ similar to that described above with respect to the documents in the collection of documents (step 904). Notice that when creating the pseudo-document vector, there is no need to create an inverted index for the query because the inverted index created in step 804 of FIG. 8 is used solely for reducing the number of documents to be presented in the semantic space. However, if the query document is to become a part of the document database for additional document comparisons with other query documents, then in might be prudent to create the inverted index for the query document.

Alternatively, the query document need be represented merely as $D_q$ equals $X^T T S^{-1}$. Again, $X^T$ is a column vector formed from the term vector of the terms which co-occur in the weighted term dictionary G and in the query document $d_q$. Further, co-occurring terms' local weights from the query document $d_q$ are scaled by the global weights $G_i$ taken from the term dictionary G. Matrices T and S are taken directly from the concept database and represent the term vector matrix T and singular value matrix.

Similar documents may be found in the document database by using an exemplary query that combines a Boolean search and a reduced dimensional vector search using pseudo-document vectors. Thus, in accordance with an exemplary embodiment of the present invention, a query is composed of two distinct parts: a Boolean query and matching pseudo-document vectors. With regard to the first part, the Boolean query allows the combination of field value constraints, including the existence of certain key terms as well as precise field values and ranges and acts as a filter for selecting a subset S of documents from the document database which match the query condition. With regard to the second part, documents $d_l$ through $d_s$ in the subset S are compared to each other by matching corresponding pseudo-document vectors $D_l$ through $D_s$, thereby ranking documents $d_l$ through $d_s$ in subset S based on the similarity of pseudo-document vectors projected in the representative semantic space.

Document comparisons are made by taking the inner product of pseudo-document vectors. A resulting set of values for matching any of pseudo-document vectors $D_l$ through $D_s$ to all other pseudo-document vectors $D_l$ through $D_s$ represents a document comparison based on the similarity criteria used for creating the concept database. The resulting set of values is sorted from largest to smallest. Larger inner products correspond to a greater semantic similarity between documents. The resulting set of matching documents is the set of documents in subset S, ranked by how closely they match each other. Alternatively, a query pseudo-document vector $D_q$ is derived from a search or query document $d_q$ which typifies similarity criteria for a comparison or search document. Query document $d_q$ represents particular parametric attributes for the similarity criteria used to create the concept database. Once created, query document $d_q$ and query pseudo-document vector $D_q$ are included in the document database as any other document in the collection. The aspects of the present invention discussed above are further described below with respect to the flowchart on FIG. 10.

Figure 10:
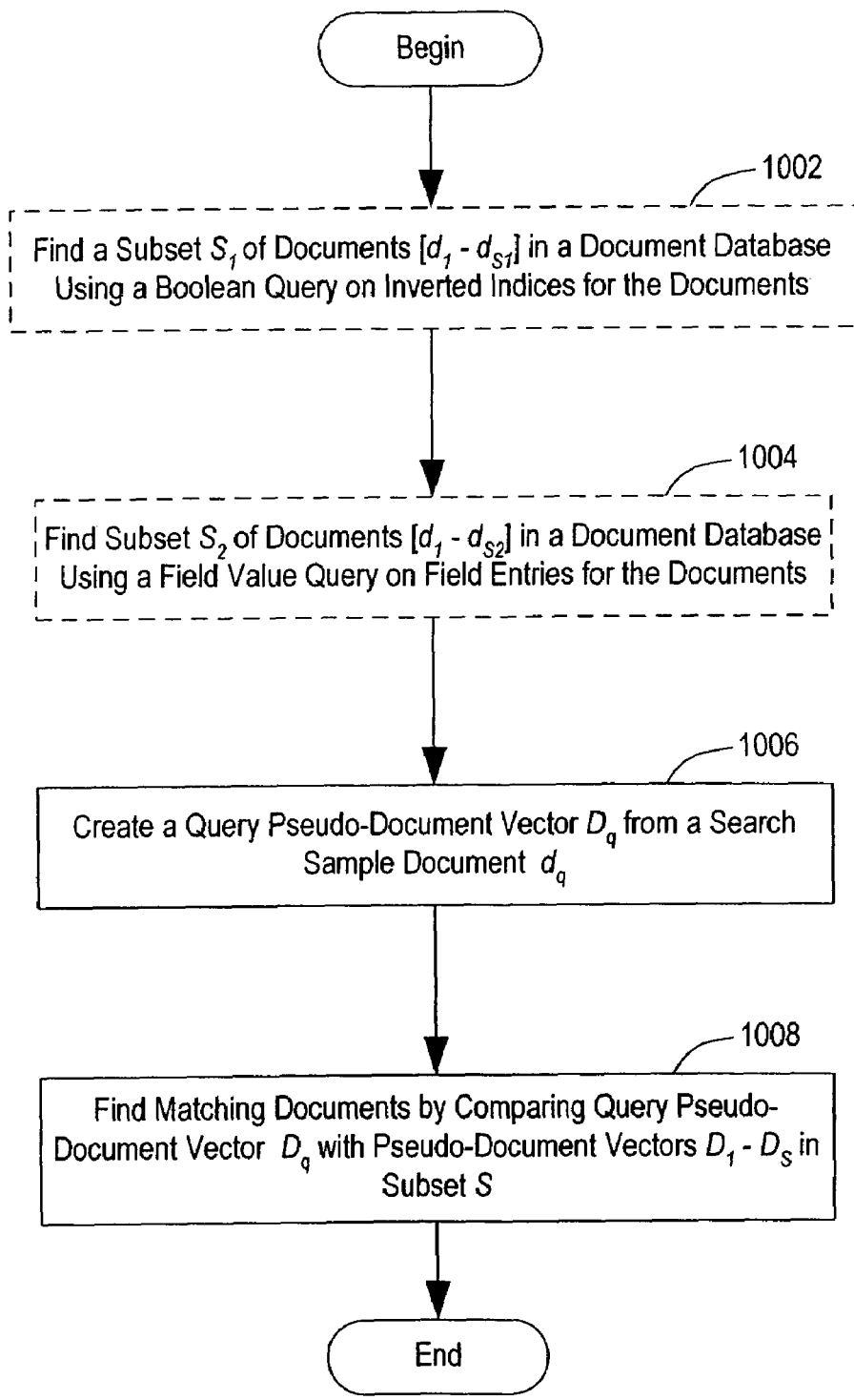
FIG. 10 is a flowchart depicting an optimized process for finding the similarity between documents in a document database in accordance with an exemplary embodiment of the present invention.

FIG. 10 is a flowchart depicting an optimized process for finding the similarity between documents in a document database in accordance with an exemplary embodiment of the present invention. The process depicted in FIG. 10 is performed subsequent to creating a document database as represented by step 504 in FIG. 5 (and further described in FIG. 8). One intent of the presently described process is to further optimize the representative semantic analysis search process by reducing the size of the document database to be used for document ranking. However, reducing the number of documents to be compared in the document database is optional and may not be performed. It should be understood that if documents are removed from the document database prior to matching the pseudo-document vectors, the advantage of using the present representative semantic analysis is not realized for the removed documents.

The process begins by finding a subset $S_l$ (subset $S_l$ comprising document $d_l$ through document $d_{sl}$ and having exactly $s_l$ number of documents) from an inverted index which maps each term in the collection of documents to the documents in the collection using Boolean query (step 1002). Steps 1002 and 1004 represent optimizations of the representative semantic analysis searching process and are represented as dashed process boxes. In doing so, documents in the document database can be either included or excluded from further consideration by using selected terms in the Boolean query. Next, a second subset, subset $S_2$, is obtained from the original document database, or alternatively from documents $d_l$ to $d_{sl}$ in subset $S_1$, by using a field value query. Subset $S_2$ comprises document $d_l$ through document $d_{s2}$ and has exactly s2 number of documents. Here, rather than using Boolean logic to search the actual terms in the documents, field values associated with documents in the collection are used for including or eliminating a document in the document database. For example, with respect to a database of documents on object-oriented processing, one field may be presented for the date of the document, for instance, 1999. In an effort to reduce the number of documents for consideration in the representative semantic analysis, the user may limit the search of documents to a period which the user feels is relevant. To illustrate, a field query value may be set greater than 1998, or ">1998." In that case, documents having field year values of "1999," "2000" or "2001" would be included for further consideration. Thus, a document with a date field value of "1999" would be included in the document database for further representative semantic analysis.

If a query document is to be used as a basis for the document comparison, the process continues by constructing a query pseudo-document vector $D_q$ from a search sample document $d_q$ as discussed above with respect to step 506 in FIG. 5 (and further described in FIG. 9). Query pseudo-document vector $D_q$ included in the document database contains an additional database with a set of pseudo-document vectors, each of which represents a unique document in the document database. A pseudo-document vector $D_i$ is derived from the text of a document $d_i$ in the document database and the concept database (T and S matrices and the weighted dictionary of terms) by using the formula $D=X^TTS^{-1}$, where X is a term vector representing occurrences of terms in the weighted term dictionary G for the document $d_j$. Each time a document $d_j$ is added to the document database, a pseudo-document vector $D_j$ is created for the document, the document field data is stored, and the associated field indices and the field inverted indices are updated accordingly.

The process then continues by matching the query document to a subset of documents in the document database by comparing the pseudo-document vector $D_q$ with pseudo-document vectors $D_l$ through $D_s$ in the subset S (step 1008). S is a subset of documents in the document database which have been identified for further consideration by one of a Boolean search query or a field value query. As described elsewhere above, comparing documents involves finding the dot product between any two pseudo-document two vectors e.g., pseudo-document vector $D_i$ and pseudo-document vector $D_j$ that define the subject document $d_i$ and document $d_j$, respectively. Again, this product results in the cosine of the pseudo-document vectors being compared i.e., pseudo-document vector $D_i$ and pseudo-document vector $D_j$. As the product approaches "1.0," subject documents $d_i$ and $d_j$ are more similar. Thus, the pseudo-document vector (any of pseudo-document vector $D_l$ through pseudo-document vector $D_s$) in which the resultant dot product with pseudo-document vector $D_q$ is closest to a value of "1.0" corresponds to the most similar document $d_j$ to query document $d_q$, based on the similarity criteria used for defining the concept database.

Alternatively, documents $d_l$ through $d_s$ are ranked by document similarity by listing the cosine values (dot products) between the pseudo-document vector $D_j$ for document $d_j$, and all other pseudo-document vectors associated with documents to be compared, such as pseudo-document vectors $D_l$ to $D_s$ for documents $d_l$ to $d_s$ in a collection of documents. Ranking can be performed as an iterative process in which each document in the collection is compared to every other document in the document collection by matching the documents' corresponding pseudo-document vectors. The process then ends.

Presented below is pseudo code for implementing an exemplary search of a document database based on hiring criteria.

Example: Assuming a concept database consisting of a weighted term dictionary, reduced term matrix built from repository of resumes, and document database of indexed searchable documents job descriptions:

Query: "I am a c++ programmer with experience in object oriented analysis and design looking for senior level development position" with required terms "oop" and fielded requirement "Salary>$60,000"

Assuming document database index is of following example fielded structure:
<key>Job0001</key>
<job-title>job title here </job-title>
<salary>45000</salary>
<body>this is the body of the job description</body>
The Boolean query could take the form of:
"body contains 'oop' " and "salary>'60000'", returning a subset of documents matching these criteria. Following, a ranked list of results is produced by computing the cosine distance between the pseudo-document for the query text and the stored pseudo-documents in the document database;

Results:
1. <key>Job6531</key>
<job-title>Senior Level Software Engineer</job-title>
<salary>75000</salary>
<body>Acme Software is looking for a senior software engineer for design and development of signal processing applications. Candidate should be proficient in c++, with experience in OOAD and OOP. </body>
score: 0.78
2. <key>Job1345</key>
<job-title>Sr. Software Developer</job-title>
<salary>62000</salary>
<body>Startup looking for programmer with four (4)+ years of hands-on C++ and OOP programming experience and a minimum of five (5) years overall software engineering experience to develop text messaging system.</body>
score: 0.76

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:
1. A method for comparing documents for similarity comprising:

generating a first pseudo-document vector utilizing a first document and a term-by-concept matrix determined from a set of documents that does not include the first document;
generating a second pseudo-document vector utilizing a second document and said term-by-concept matrix; and
determining similarity of said first document and said second document based on said first pseudo-document vector and said second pseudo-document vector.

2. The method of claim 1, further comprising:
selecting the set of documents based on at least one similarity criterion, wherein the at least one similarity criterion is one of document language, document type, subject matter and a category of a subject matter.

3. The method of claim 1, further comprising:
generating a weighted term-by-document matrix; and
decomposing the weighted term-by-document matrix to obtain the term-by-concept matrix and a reduced singular value matrix S.

4. The method of claim 3, wherein said generating a weighted term-by-document matrix comprises:
identifying terms occurring in the set of documents;
finding a global term weight for each identified term based on a frequency of occurrences for said each term in the group of documents;
finding a local term weight for each identified term based on a frequency of occurrences for said each term in each document in the group of documents;
organizing said local term weights in a term-by-document matrix for the identified terms; and
creating a weighted term-by-document matrix by applying a global term weight to a corresponding local term weight for each of the respective identified terms in the term-by-document matrix.

5. The method of claim 4, wherein the first pseudo-document vector is a product of a term vector $A_d^T$ with the term-by-document matrix T and an inverse reduced concepts matrix $S^{-1}$, said term vector $A_d^T$ being formed from identified terms occurring in said first document, and said identified occurring terms being weighted based on frequency of occurrence in said first document and scaled based on the global weight of said each of said identified occurring term.

6. The method of claim 5, further comprising:
compiling a collection of documents;
generating a pseudo-document vector for each of the documents in the collection of documents, each pseudo-document vector being formed using a document from the collection of documents and the term-by-concept matrix; and
determining similarity of each document in the collection of documents to the first document based on a comparison of said first pseudo-document vector to each pseudo-document vector for the documents in the collection of documents.

7. The method of claim 1, further comprising:
adding a document to the collection of documents; and
generating a pseudo-document vector for the added document, the added pseudo-document vector being formed using the added document and the term-by-concept matrix.

8. A method for searching a collection of documents, the method comprising:
defining a representative semantic space, wherein the defining includes:
compiling a corpus having a plurality of documents;
identifying terms occurring in the corpus;
constructing a weighted term-by-document matrix from weighted term frequencies of the corpus;
decomposing the weighted term-by-document matrix into at least a term-by-concept matrix and a singular value matrix; and
forming a reduced term-by-concept matrix and a reduced singular value matrix;
compiling a document collection having at least one document that is not in the corpus; and
using the representative semantic space to generate a pseudo-document vector for each document in a set of multiple documents in the document collection.

9. The method of claim 8, wherein the set of multiple documents comprises all documents in the document collection.

10. The method of claim 8, wherein compiling a corpus includes applying a random selection method to documents in the document collection.

11. The method of claim 8, further comprising:
receiving at least one query document;
using the representative semantic space to generate a query pseudo-document vector for the query document; and
comparing the query pseudo-document vector to the pseudo-document vectors for the set of multiple documents in the document collection.

12. The method of claim 11, further comprising:
ranking documents in the set of multiple documents based on said comparing the query pseudo-document vector to the pseudo-document vectors.

13. The method of claim 8, further comprising:
obtaining a query having search terms;
forming a query vector from the search terms and weighted term frequencies of the corpus;
generating a query pseudo-document vector using the representative semantic space; and
comparing the query pseudo-document vector to the pseudo-document vectors for the set of multiple documents in the document collection.

14. The method of claim 13, further comprising:
constructing an index of terms identifying, for each term, documents from the document collection in which that term appears; and
determining the set of multiple documents for which to generate a pseudo-document vector, wherein the determining includes performing a Boolean search of the document collection using the search terms and the index of terms.

15. The method of claim 8, further comprising:
constructing an index of terms identifying, for each term, documents from the set of multiple documents in which that term appears;
obtaining a query having search terms;
performing a Boolean search of the set of multiple documents using query search terms and the index of terms to obtain a document subset;
forming a query vector from the search terms and weighted term frequencies of the corpus;
generating a query pseudo-document vector using the representative semantic space; and
ranking documents in the document subset based on comparisons of the query pseudo-document vector to the pseudo-document vectors for the document subset.

16. The method of claim 8, wherein documents are added to the document collection without re-defining the representative semantic space.

17. The method of claim 8, wherein documents are removed from the document collection without re-defining the representative semantic space.

18. The method of claim 8, wherein the document collection comprises resumes.

19. The method of claim 8, wherein the document collection comprises patents or patent applications.

20. A system comprising:
a network;
a server connected to said network, said server comprising:
an interface for interfacing with the network;
a memory, said memory containing instructions for:
identifying terms occurring in a plurality of documents;
determining for each document a local term weight for each identified term;
creating a weighted term-by-document matrix using at least the local term weights for each of the respective identified terms;
decomposing the weighted term-by-document matrix into at least a term-by-concept matrix and a singular value matrix;
using the term-by-concept matrix and the singular value matrix to determine a pseudo-document vector for a document not included in said plurality of documents; and
a processor for executing instructions from memory.

21. The system of claim 20, further comprising:
a client connected to said network, said client passing a plurality of documents to said server, said client indicating for said server to generate a plurality of pseudo-document vectors for said plurality of documents.

22. A program product stored on a computer readable storage medium for performing a method, the program product comprising:
instructions for generating a first pseudo-document vector using a first document and a term-by-concept matrix determined from a set of documents that does not include the first document;
instructions for generating a second pseudo-document vector using a second document and the term-by-concept matrix; and
instructions for determining similarity of said first document and said second document based on said first pseudo-document vector and said second pseudo-document vector.

23. The program product of claim 22, further comprising:
instructions for compiling a collection of documents;
instructions for generating a pseudo-document vector for each of the documents in the collection of documents, each of said pseudo-document vectors being formed using a document from the collection of documents and the term-by-concept matrix; and
instructions for determining similarity of each document in the collection of documents to said first document based on a comparison of said first pseudo-document vector to each pseudo-document vector for the documents in the collection of documents.

24. The program product of claim 23, wherein the first document is a query document.

25. The program product of claim 23, wherein the collection of documents includes at least one document outside the set of documents used to determine the term-by-concept matrix.

26. A computer implemented search method that comprises:
applying a representative semantic space to a document set to obtain a set of pseudo-document vectors;
applying the representative semantic space to a query to obtain a query pseudo-document vector; and
ranking documents from the document set by comparing the corresponding pseudo-document vectors to the query pseudo-document vector.

27. The search method of claim 26, further comprising:
before said ranking, performing a Boolean keyword search on the document set to identify a subset of documents to be ranked.

28. The search method of claim 26, further comprising:
before said ranking, performing a field search to identify a subset of documents to be ranked.

29. The search method of claim 26, wherein the query comprises a set of keywords.

30. The search method of claim 26, further comprising:
defining the representative semantic space based on a subset of the document set, wherein the defining comprises:
constructing a term-by-document matrix having weighted term frequencies for the subset;
decomposing the term-by-document matrix to obtain at least a term-by-concept matrix and a singular value matrix; and
forming a reduced term-by-concept matrix by retaining that portion of the term-by-concept matrix corresponding to a predetermined number of largest singular values.

31. The search method of claim 26, further comprising:
adding a document to the document set after the ranking is performed;
applying the representative semantic space to the added document to obtain a corresponding pseudo-document vector; and
ranking the new document by comparing the corresponding pseudo-document vector to the query pseudo-document vector.

* * * * *